US012611666B2

(12) United States Patent
Szemjonov et al.

(10) Patent No.: US 12,611,666 B2
(45) Date of Patent: Apr. 28, 2026

(54) SUBSTRATE WITH ORTHOGONALLY FUNCTIONAL NANODOMAINS

(71) Applicant: Illumina, Inc.

(72) Inventors: Alexandra Szemjonov, Cambridge (GB); Wayne N. George, London (GB); Alexandre Richez, Cambourne (GB)

(73) Assignee: Illumina, Inc., San Diego, CA (US)

( * ) Notice: Subject to any disclaimer, the term of this patent is extended or adjusted under 35 U.S.C. 154(b) by 242 days.

(21) Appl. No.: 18/186,647

(22) Filed: Mar. 20, 2023

(65) Prior Publication Data

US 2023/0330659 A1 Oct. 19, 2023

Related U.S. Application Data

(60) Provisional application No. 63/269,757, filed on Mar. 22, 2022.

(51) Int. Cl.

| | |
|---|---|
| ***B01L 3/00*** | (2006.01) |
| ***C09D 5/02*** | (2006.01) |
| ***C09D 133/26*** | (2006.01) |
| *B29C 33/42* | (2006.01) |
| *B29C 59/02* | (2006.01) |
| *B29K 77/00* | (2006.01) |

(52) U.S. Cl.

CPC .......... *B01L 3/502707* (2013.01); *C09D 5/02* (2013.01); *C09D 133/26* (2013.01); *B01L 2200/12* (2013.01); *B29C 33/424* (2013.01); *B29C 2033/426* (2013.01); *B29C 59/022* (2013.01); *B29C 59/026* (2013.01); *B29K 2077/00* (2013.01)

(58) Field of Classification Search

CPC . B01L 3/502707; B01L 2200/12; C09D 5/02; C09D 133/26

See application file for complete search history.

(56) References Cited

U.S. PATENT DOCUMENTS

| | | | |
|---|---|---|---|
| 5,429,807 | A | 7/1995 | Matson et al. |
| 5,436,327 | A | 7/1995 | Southern et al. |
| 5,561,071 | A | 10/1996 | Hollenberg et al. |
| 5,583,211 | A | 12/1996 | Coassin et al. |

(Continued)

FOREIGN PATENT DOCUMENTS

| | | |
|---|---|---|
| EP | 0 742 287 | 1/2006 |
| EP | 0 799 897 | 6/2006 |

(Continued)

OTHER PUBLICATIONS

Im et al., 2008, Patterning Nanodomains with Orthogonal Functionalities: Solventless Synthesis of Self-Sorting Surfaces, J. Am. Chem. Soc., 130:14424-14425 and supporting information.

(Continued)

*Primary Examiner* — Maria V Ewald
*Assistant Examiner* — Ethan Weydemeyer
(74) *Attorney, Agent, or Firm* — KNOBBE, MARTENS, OLSON & BEAR, LLP

(57) ABSTRACT

Embodiments of the present disclosure also relate to methods of fabricating flow cell substrates. Some exemplary workflows exploit orthogonal chemistries of substrate layers such that the process does not include polishing steps. Substrates prepared by the method described herein can include a first primer set and a second primer set compatible with simultaneous paired-end sequencing methods.

22 Claims, 6 Drawing Sheets

Specification includes a Sequence Listing.

(56) References Cited

U.S. PATENT DOCUMENTS

| | | | |
|---|---|---|---|
| 5,658,734 | A | 8/1997 | Brock et al. |
| 5,837,858 | A | 11/1998 | Brennan |
| 5,874,219 | A | 2/1999 | Rava et al. |
| 5,919,523 | A | 7/1999 | Sundberg et al. |
| 6,136,269 | A | 10/2000 | Winkler et al. |
| 6,287,768 | B1 | 9/2001 | Chenchik et al. |
| 6,287,776 | B1 | 9/2001 | Hefti |
| 6,288,220 | B1 | 9/2001 | Kambara et al. |
| 6,291,193 | B1 | 9/2001 | Khodadoust |
| 6,297,006 | B1 | 10/2001 | Drmanac et al. |
| 6,346,413 | B1 | 2/2002 | Fodor et al. |
| 6,416,949 | B1 | 7/2002 | Dower et al. |
| 6,482,591 | B2 | 11/2002 | Lockhart et al. |
| 6,514,751 | B2 | 2/2003 | Johann et al. |
| 6,610,482 | B1 | 8/2003 | Fodor et al. |
| 7,842,498 | B2 | 11/2010 | Um et al. |
| 8,951,781 | B2 | 2/2015 | Reed et al. |
| 9,012,022 | B2 | 4/2015 | George et al. |
| 11,124,829 | B2 | 9/2021 | Fisher et al. |
| 2010/0111768 | A1 | 5/2010 | Banerjee et al. |
| 2011/0059865 | A1 | 3/2011 | Smith et al. |
| 2012/0309634 | A1 | 12/2012 | Rigatti et al. |
| 2012/0316086 | A1 | 12/2012 | Lin et al. |
| 2013/0116153 | A1 | 5/2013 | Bowen et al. |
| 2015/0005447 | A1 | 1/2015 | Berti et al. |
| 2016/0122816 | A1 | 5/2016 | Brown et al. |
| 2018/0274026 | A1 | 9/2018 | Brown et al. |
| 2019/0352327 | A1 | 11/2019 | Wu et al. |
| 2021/0024991 | A1 | 1/2021 | Fisher et al. |
| 2021/0190675 | A1 | 6/2021 | Hong et al. |

FOREIGN PATENT DOCUMENTS

| | | |
|---|---|---|
| WO | WO 93/17126 | 9/1993 |
| WO | WO 95/11995 | 5/1995 |
| WO | WO 95/35505 | 12/1995 |
| WO | WO 14/142841 | 9/2014 |
| WO | WO 21/127357 | 6/2021 |

OTHER PUBLICATIONS

Kehagias et al., 2009, Stamp replication for thermal and UV nanoimprint lithography using a UV-sensitive silsesquioxane resist, Microelectronic Engineering, 86:776-778.

International search report and written opinion dated Jul. 31, 2023 in International Application No. PCT/US2023/064690, filed Mar. 20, 2023.

SEQUENCE LISTING

```
Sequence total quantity: 6
SEQ ID NO: 1            moltype = DNA  length = 29
FEATURE                 Location/Qualifiers
misc_feature            1..29
                        note = P5 primer
source                  1..29
                        mol_type = other DNA
                        organism = synthetic construct
modified_base           23
                        mod_base = OTHER
                        note = n is deoxyuridine
SEQUENCE: 1
aatgatacgg cgaccaccga ganctacac                                         29

SEQ ID NO: 2            moltype = DNA  length = 24
FEATURE                 Location/Qualifiers
misc_feature            1..24
                        note = Synthetic oligonucleotide
source                  1..24
                        mol_type = other DNA
                        organism = synthetic construct
SEQUENCE: 2
caagcagaag acggcatacg agat                                              24

SEQ ID NO: 3            moltype = DNA  length = 20
FEATURE                 Location/Qualifiers
misc_feature            1..20
                        note = Synthetic oligonucleotide
source                  1..20
                        mol_type = other DNA
                        organism = synthetic construct
SEQUENCE: 3
aatgatacgg cgaccaccga                                                   20

SEQ ID NO: 4            moltype = DNA  length = 21
FEATURE                 Location/Qualifiers
misc_feature            1..21
                        note = Synthetic oligonucleotide
source                  1..21
                        mol_type = other DNA
                        organism = synthetic construct
SEQUENCE: 4
caagcagaag acggcatacg a                                                 21

SEQ ID NO: 5            moltype = DNA  length = 29
FEATURE                 Location/Qualifiers
misc_feature            1..29
                        note = Synthetic oligonucleotide
source                  1..29
                        mol_type = other DNA
                        organism = synthetic construct
modified_base           23
                        mod_base = OTHER
                        note = n is 5 prime-vinyl thymidine
SEQUENCE: 5
aatgatacgg cgaccaccga ganctacac                                         29

SEQ ID NO: 6            moltype = DNA  length = 24
FEATURE                 Location/Qualifiers
misc_feature            1..24
                        note = P17 primer
source                  1..24
                        mol_type = other DNA
                        organism = synthetic construct
SEQUENCE: 6
caagcagaag acggcatacg agat                                              24
```

SUBSTRATE WITH ORTHOGONALLY FUNCTIONAL NANODOMAINS

CROSS-REFERENCE TO RELATED APPLICATION

This application claims the benefit of priority to U.S. Provisional Application No. 63/269,757, filed Mar. 22, 2022, the content of which is incorporated by reference in its entirety.

REFERENCE TO SEQUENCE LISTING

The present application is being filed along with a Sequence Listing in electronic format. The Sequence Listing is provided as a file entitled Replacement_ILLINC574A.xml, created Jul. 9, 2023, which is 10,283 bytes in size. The information in the electronic format of the Sequence Listing is incorporated herein by reference in its entirety.

FIELD

The present application relates to the fields of nanopatterning process and substrates comprising microscale or nanoscale patterned surfaces with orthogonally functional nanodomains.

BACKGROUND

Flow cells are devices that allow fluid flow through channels or wells within a substrate. Patterned flow cells that are useful in nucleic acid analysis methods include discrete wells having an active surface within inert interstitial regions. Flowcells fabricated through nanoimprint lithography (NIL) consist of a patterned crosslinked resin material on a glass substrate. Patterning is achieved by depositing a NIL resin containing polymerizable multifunctional monomers onto a glass substrate to create a thin film. A working stamp (WS) is pressed onto the resin surface and the NIL resin material deforms to fill the WS pattern. While the WS is still in contact with the surface, polymerization of the resin is initiated by exposure to light or heat, and the resin is cured. After the resin is sufficiently crosslinked such that it is no longer able to flow, the working stamp is peeled away from the surface, leaving behind an imprinted resin surface. The resulting nanostructured surface is then functionalized via multiple chemistry steps (e.g., silanization, hydrogel deposition, DNA oligo grafting) to support sequencing.

To ensure that DNA sequencing is spatially restricted into nanowells pre-defined by the working stamp pattern, the nanopatterned surfaces need to be polished prior to the grafting of the DNA oligos. This extra step results in the waste of NIL resin and requires additional quality control time and efforts.

Some available platforms for sequencing nucleic acids utilize a sequencing-by-synthesis approach (SBS). With this approach, nascent strands are synthesized, and the incorporation of labeled nucleotides to the growing strands are detected optically and/or electronically. Because template strands direct synthesis of the nascent strands, the sequence of the template DNAs may be determined from the sequential incorporated nucleotides that were added to the growing strand during SBS. In some examples, paired-end sequencing may be used, where forward strands are sequenced (read 1) and removed, and then reverse strands are constructed and sequenced (read 2). Simultaneous paired-end reading (SPEAR) method has been reported in U.S. Publication No. 2021/0024991, issued as U.S. Pat. No. 11,124,829, each of which is incorporated by reference in its entirety. The SPEAR method can simultaneously sequence the forward (read 1) and reverse (read 2) DNA strands, thus reduce sequencing time in half. The spatial separation of read 1 and read 2 pads is generally required in complicated multiple nanopatterning steps involving several layers of materials, some of which act as temporary sacrificial masks.

As such, there remains a demand to develop new cost-effective processes to simplify the substrate patterning processes. Provided herein are new process of manufacturing patterned substrate with orthogonally functionalized nanodomains to support nucleic acid sequencing applications.

SUMMARY

One aspect of the present disclosure relates to a patterned substrate, comprising: a base support;

a multi-layer stack positioned over the base support; the multi-layer stack comprising:

a first layer positioned over the base support;

a second layer positioned over the first layer, wherein the second layer comprises a plurality of depressions through the second layer and expose a surface of the first layer; and a functionalized hydrogel within at least a portion of the plurality of depressions, wherein the functionalized hydrogel is covalently attached to the first layer;

wherein the first layer of the multi-layer stack comprises a first polymer having a plurality of first functional groups selected from the group consisting of an amino, an alkynyl, a cycloalkenyl, a cycloalkynyl, a carboxyl, a vinyl, and a thiol; and wherein the second layer of the multi-layer stack comprises a second polymer having a plurality of second functional groups selected from the group consisting of an amino, an alkynyl, a cycloalkenyl, a cycloalkynyl, a carboxyl, a vinyl, and a thiol, and the second functional groups are orthogonal to the first functional groups.

Another aspect of the present disclosure relates to a patterned substrate, comprising:

a base support;

a multi-layer stack positioned over the base support; the multi-layer stack comprising:

a first layer positioned over the base support;

a second layer positioned over the first layer, wherein the second layer comprises a first plurality of depressions through the second layer which expose a surface of the first layer; and a third layer positioned over the second layer, wherein the third layer comprises a second plurality of depressions through the third layer which expose a surface of the second layer, wherein the second plurality of depressions are spatially separated from the first plurality of depressions;

a first functionalized hydrogel within at least a portion of the first plurality of depressions, wherein the first functionalized hydrogel is covalently attached to the first layer; and a second functionalized hydrogel within at least a portion of the second plurality of depressions, wherein the second functionalized hydrogel is covalently attached to the second layer;

wherein the first layer of the multi-layer stack comprises a first polymer having a plurality of first functional groups selected from the group consisting of an amino, an alkynyl, a cycloalkenyl, a cycloalkynyl, a carboxyl, a vinyl, and a thiol;

wherein the second layer of the multi-layer stack comprises a second polymer having a plurality of second functional groups selected from the group consisting of an amino, an alkynyl, a cycloalkenyl, a cycloalkynyl, a carboxyl, a vinyl, and a thiol, and the second functional groups are orthogonal to the first functional groups; and wherein the third layer does not comprise either the first or the second functional groups, and wherein the third layer is inert to both the first functionalized hydrogel and the second functionalized hydrogel.

Another aspect of the present disclosure relates to a method of patterning a surface of a substrate, comprising:

contacting a stamp comprising a plurality of microscale or nanoscale patterns with a multi-layer stack positioned over a base support of a substrate, wherein the multi-layer stack comprises a first layer positioned over the base support and a second layer positioned over the first layer;

imprinting through the second layer to create a plurality of depressions and expose a surface of the first layer; and contacting the surface of the first layer with a functionalized hydrogel to form covalent bonding between the first layer and the functionalized hydrogel;

wherein the first layer of the multi-layer stack comprises a first polymer having a plurality of first functional groups selected from the group consisting of an amino, an alkynyl, a cycloalkenyl, a cycloalkynyl, a carboxyl, a vinyl, and a thiol, wherein the second layer of the multi-layer stack comprises a second polymer having a plurality of second functional groups selected from the group consisting of an amino, an alkynyl, a cycloalkenyl, a cycloalkynyl, a carboxyl, a vinyl, and a thiol, and the second functional groups are orthogonal to the first functional groups.

Another aspect of the present disclosure relates to a method for patterning a surface of a substrate, comprising:

contacting a stamp comprising a plurality of multi-level microscale or nanoscale patterns with a multi-layer stack positioned over a base support of a substrate, wherein the multi-layer stack comprises a first layer positioned over the base support, a second layer positioned over the first layer, and a third layer positioned over the second layer;

imprinting the third layer to create a plurality of multi-level depressions each comprising a deep portion and a shallow portion defined by a step portion;

etching the third layer to transfer the plurality of the multi-level depressions from the third layer to the second layer and the first layer, wherein the deep portion of the depressions are transferred to the first layer and exposes a surface of the first layer, wherein the shallow portion of the depressions are transferred to the second layer and expose a surface of the second layer; and contacting the exposed surface of the first layer and the exposed surface of the second layer with a polymer composition comprising a first functionalized hydrogel and a second functionalized hydrogel to covalently attach the first functionalized hydrogel to the exposed surface of the first layer, and to covalently attach the second functionalized hydrogel to the exposed surface of the second layer;

wherein the first layer of the multi-layer stack comprises a first polymer having a plurality of first functional groups selected from the group consisting of an amino, an alkynyl, a cycloalkenyl, a cycloalkynyl, a carboxyl, a vinyl, and a thiol, wherein the second layer of the multi-layer stack comprises a second polymer having a plurality of second functional groups selected from the group consisting of an amino, an alkynyl, a cycloalkenyl, a cycloalkynyl, a carboxyl, a vinyl, and a thiol, and the second functional groups are orthogonal to the first functional groups; and wherein the third layer does not comprise either the first or the second functional groups, and wherein the third layer is inert to both the first functionalized hydrogel and the second functionalized hydrogel.

DETAILED DESCRIPTION

Figure 1A:
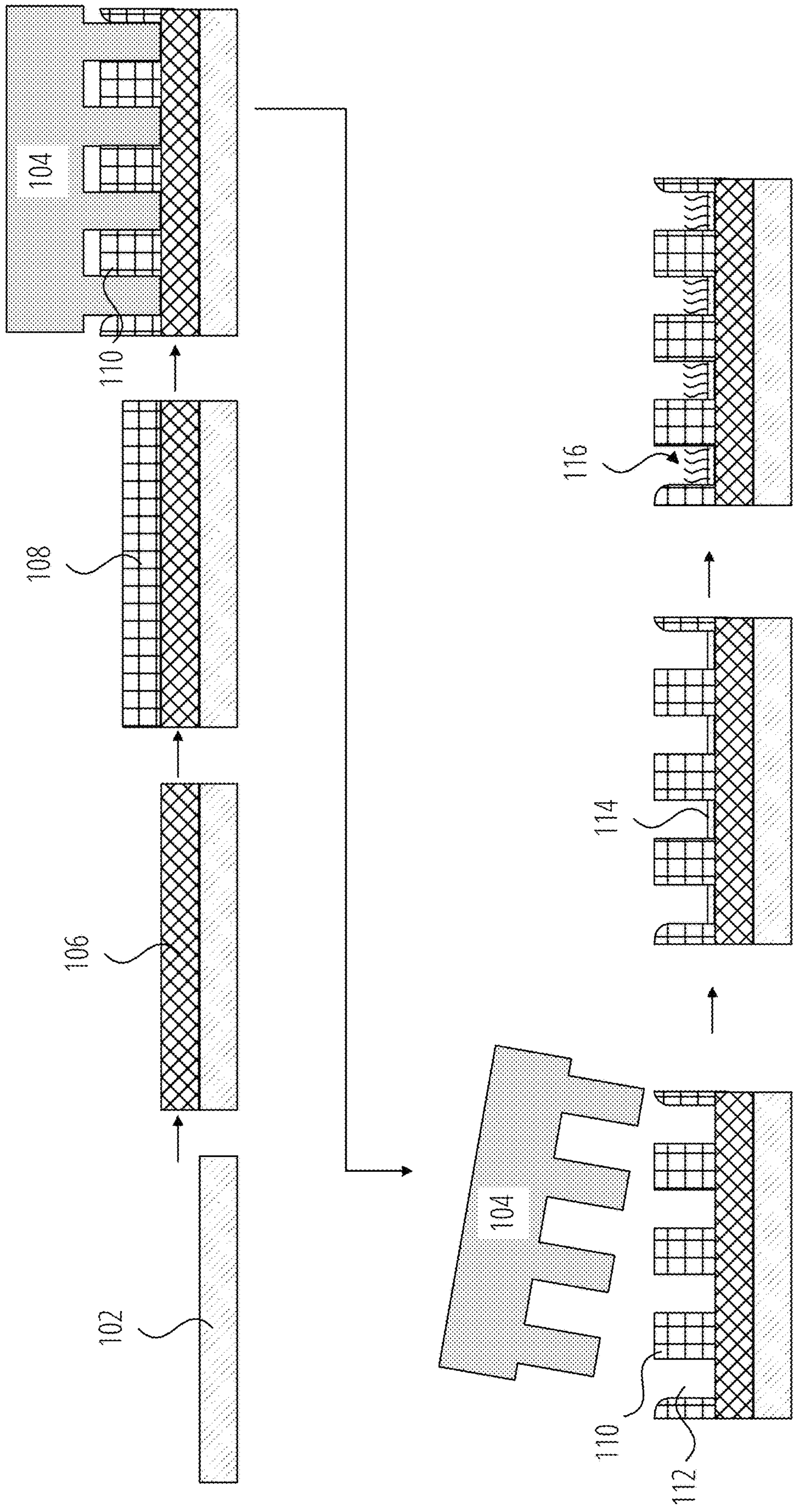
FIG. 1A schematically illustrates a first example of a polish-free workflow to prepare a patterned substrate according to an embodiment of the present disclosure.

The present disclosure relates to the substrates, and fabrication process thereof, including nanodomains having orthogonal functionalities. Inclusion of such orthogonal functional groups may be desirable, as it may facilitate a polish-free process of preparing patterned substrate or a one-pot process for functionalizing the surface of substrates for SPEAR application. In particular, the substrates disclosed herein include flowcells which may be used for nucleic acid sequencing, e.g. SBS.

The section headings used herein are for organizational purposes only and are not to be construed as limiting the subject matter described.

Definition

Unless defined otherwise, all technical and scientific terms used herein have the same meaning as is commonly understood by one of ordinary skill in the art. The use of the term “including” as well as other forms, such as “include,” “includes,” and “included,” is not limiting. The use of the term “having” as well as other forms, such as “have,” “has,” and “had,” is not limiting. As used in this specification, whether in a transitional phrase or in the body of the claim, the terms “comprise(s)” and “comprising” are to be interpreted as having an open-ended meaning. That is, the above terms are to be interpreted synonymously with the phrases “having at least” or “including at least.” For example, when used in the context of a process, the term “comprising” means that the process includes at least the recited steps, but may include additional steps. When used in the context of a compound, composition, or device, the term “comprising” means that the compound, composition, or device includes at least the recited features or components, but may also include additional features or components.

Language of degree used herein, such as the terms “approximately,” “about,” “generally,” and “substantially” as used herein represent a value, amount, or characteristic close to the stated value, amount, or characteristic that still performs a desired function or achieves a desired result. For example, the terms “approximately”, “about”, “generally,” and “substantially” may refer to an amount that is within less than 10% of, within less than 5% of, within less than 1% of, within less than 0.1% of, and within less than 0.01% of the stated amount.

The term “and/or” as used herein has its broadest least limiting meaning which is the disclosure includes A alone, B alone, both A and B together, or A or B alternatively, but does not require both A and B or require one of A or one of B. As used herein, the phrase “at least one of” A, B, “and” C should be construed to mean a logical A or B or C, using a non-exclusive logical “or.”

The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list.

As used herein, common abbreviations are defined as follows:

dATP Deoxyadenosine triphosphate
dCTP Deoxycytidine triphosphate
dGTP Deoxyguanosine triphosphate
dTTP Deoxythymidine triphosphate
PAZAM Poly(N-(5-azidoacetamidylpentyl) acrylamide-co-acrylamide) of any acrylamide to Azapa ratio
SBS Sequencing-by-synthesis As used herein, the term “attached” refers to the state of two things being joined, fastened, adhered, connected or bound to each other. For example, an analyte, for example a nucleic acid, can be attached to a material, for example a gel or solid support, by a covalent or non-covalent bond. A covalent bond is characterized by the sharing of pairs of electrons between atoms. A non-covalent bond is a chemical bond that does not involve the sharing of pairs of electrons and can include, for example, hydrogen bonds, ionic bonds, van der Waals forces, hydrophilic interactions and hydrophobic interactions.

As used herein, the term “array” refers to a population of different probes (e.g., probe molecules) that are attached to one or more substrates such that the different probes can be differentiated from each other according to relative location. An array can include different probes that are each located at a different addressable location on a substrate. Alternatively or additionally, an array can include separate substrates each bearing a different probe, wherein the different probes can be identified according to the locations of the substrates on a surface to which the substrates are attached or according to the locations of the substrates in a liquid. Further examples of arrays that can be used in the invention include, without limitation, those described in U.S. Pat. Nos. 5,429,807; 5,436,327; 5,561,071; 5,583,211; 5,658,734; 5,837,858; 5,874,219; 5,919,523; 6,136,269; 6,287,768; 6,287,776; 6,288,220; 6,297,006; 6,291,193; 6,346,413; 6,416,949; 6,482,591; 6,514,751 and 6,610,482; WO 93/17126; WO 95/11995; WO 95/35505; EP 742 287; and EP 799 897.

As used herein, the term “covalently attached” or “covalently bonded” refers to the forming of a chemical bonding that is characterized by the sharing of pairs of electrons between atoms. For example, a covalently attached hydrogel refers to a hydrogel that forms chemical bonds with a functionalized surface of a substrate, as compared to attachment to the surface via other means, for example, adhesion or electrostatic interaction. It will be appreciated that polymers that are attached covalently to a surface can also be bonded via means in addition to covalent attachment.

As used herein, the term “non-covalent interactions” differs from a covalent bond in that it does not involve the sharing of electrons, but rather involves more dispersed variations of electromagnetic interactions between molecules or within a molecule. Non-covalent interactions can be generally classified into four categories, electrostatic, π-effects, van der Waals forces, and hydrophobic effects. Non-limiting examples of electrostatic interactions include ionic interactions, hydrogen bonding (a specific type of dipole-dipole interaction), halogen bonding, etc. Van der Walls forces are a subset of electrostatic interaction involving permanent or induced dipoles or multipoles. π-effects can be broken down into numerous categories, including (but not limited to) π-π interactions, cation-π & anion-π interactions, and polar-π interactions. In general, π-effects are associated with the interactions of molecules with the π-orbitals of a molecular system, for example benzene. The hydrophobic effect is the tendency of nonpolar substances to aggregate in aqueous solution and exclude water molecules. Non-covalent interactions can be both intermolecular and intramolecular. Non-covalent interactions can be both intermolecular and intramolecular.

As used herein, the term “coat,” when used as a verb, is intended to mean providing a layer or covering on a surface. At least a portion of the surface can be provided with a layer or cover. In some cases, the entire surface can be provided with a layer or cover. In alternative cases only a portion of the surface will be provided with a layer or covering. The term “coat,” when used to describe the relationship between a surface and a material, is intended to mean that the material is present as a layer or cover on the surface. The material can seal the surface, for example, preventing contact of liquid or gas with the surface. However, the material need not form a seal. For example, the material can be porous to liquid, gas, or one or more components carried in a liquid or gas. Exemplary materials that can coat a surface include, but are not limited to, a gel, polymer, organic polymer, liquid, metal, a second surface, plastic, silica, or gas.

As used herein the term “analyte” is intended to include any of a variety of analytes that are to be detected, characterized, modified, synthesized, or the like. Exemplary analytes include, but are not limited to, nucleic acids (e.g., DNA, RNA or analogs thereof), proteins, polysaccharides, cells, nuclei, cellular organelles, antibodies, epitopes, receptors, ligands, enzymes (e g kinases, phosphatases or polymerases), peptides, small molecule drug candidates, or the like. An array can include multiple different species from a library of analytes. For example, the species can be different antibodies from an antibody library, nucleic acids having different sequences from a library of nucleic acids, proteins having different structure and/or function from a library of proteins, drug candidates from a combinatorial library of small molecules, etc.

As used herein the term “contour” is intended to mean a localized variation in the shape of a surface. Exemplary contours include, but are not limited to, wells, pits, channels, posts, pillars, and ridges. Contours can occur as any of a variety of depressions in a surface or projections from a surface. All or part of a contour can serve as a feature in an array. For example, a part of a contour that occurs in a particular plane of a solid support can serve as a feature in that particular plane. In some embodiments, contours are provided in a regular or repeating pattern on a surface.

Where a material is "within" a contour, it is located in the space of the contour. For example, for a well, the material is inside the well, and for a pillar or post, the material covers the contour that extends above the plane of the surface.

As used herein, the term "different", when used in reference to nucleic acids, means that the nucleic acids have nucleotide sequences that are not the same as each other. Two or more nucleic acids can have nucleotide sequences that are different along their entire length. Alternatively, two or more nucleic acids can have nucleotide sequences that are different along a substantial portion of their length. For example, two or more nucleic acids can have target nucleotide sequence portions that are different for the two or more molecules while also having a universal sequence portion that is the same on the two or more molecules. The term can be similarly applied to proteins which are distinguishable as different from each other based on amino acid sequence differences.

As used herein, the term "each," when used in reference to a collection of items, is intended to identify an individual item in the collection but does not necessarily refer to every item in the collection. Exceptions can occur if explicit disclosure or context clearly dictates otherwise.

As used herein, the term "feature" means a location in an array that is configured to attach a particular analyte. For example, a feature can be all or part of a contour on a surface. A feature can contain only a single analyte, or it can contain a population of several analytes, optionally the several analytes can be the same species. In some embodiments, features are present on a solid support prior to attaching an analyte. In other embodiments the feature is created by attachment of an analyte to the solid support.

As used herein, the term "flow cell" is intended to mean a vessel having a chamber where a reaction can be carried out, an inlet for delivering reagents to the chamber and an outlet for removing reagents from the chamber. In some embodiments, the chamber is configured for detection of the reaction that occurs in the chamber (e.g., on a surface that is in fluid contact with the chamber). For example, the chamber can include one or more transparent surfaces allowing optical detection of arrays, optically labeled molecules, or the like in the chamber. Exemplary flow cells include, but are not limited to those used in a nucleic acid sequencing apparatus such as flow cells for the Genome Analyzer®, MiSeq®, NextSeq® or HiSeq® platforms commercialized by Illumina, Inc. (San Diego, CA); or for the SOLiD™ or Ion Torrent™ sequencing platform commercialized by Life Technologies (Carlsbad, CA). Exemplary flow cells and methods for their manufacture and use are also described, for example, in WO 2014/142841 A1; U.S. Pat. App. Pub. No. 2010/0111768 A1 and U.S. Pat. No. 8,951,781, each of which is incorporated herein by reference.

As used herein, the term "hydrogel" or "gel material" is intended to mean a semi-rigid material that is permeable to liquids and gases. Typically, a hydrogel material can swell when liquid is taken up and can contract when liquid is removed, e.g., by drying. Exemplary hydrogels include, but are not limited to, those having a colloidal structure, such as agarose; polymer mesh structure, such as gelatin; or cross-linked polymer structure, such as polyacrylamide, silane free acrylamide (see, for example, US Pat. App. Pub. No. 2011/0059865 A1), PAZAM (see, for example, U.S. Pat. No. 9,012,022, which is incorporated herein by reference), and polymers described in U.S. Patent Pub. Nos. 2015/0005447 and 2016/0122816, all of which are incorporated by reference in their entireties. Particularly useful gel material will conform to the shape of a well or other contours where it resides. Some useful hydrogel materials can both (a) conform to the shape of the well or other contours where it resides and (b) have a volume that does not substantially exceed the volume of the well or contours where it resides.

As used herein, the term "interstitial region" refers to an area in a substrate or on a surface that separates other areas of the substrate or surface. In some embodiments, the interstitial region does not allow for the binding of library DNA. For example, an interstitial region can separate one library DNA binding region from another library DNA binding region. The two regions that are separated from each other can be discrete, lacking contact with each other. In some embodiments the interstitial region is continuous whereas the contours or features are discrete, for example, as is the case for an array of wells in an otherwise continuous surface. The separation provided by an interstitial region can be partial or full separation. Interstitial regions may have a surface material that differs from the surface material of the contours or features on the surface. For example, contours of an array can have an amount or concentration of gel material or analytes that exceeds the amount or concentration present at the interstitial regions. In some embodiments the gel material or analytes may not be present at the interstitial regions. In some embodiments, the DNA binding regions are inside an array of nanowells or capture pads, while the clustering primers (e.g., P5/P7 or P15/P17) are located on the interstitial regions separating the nanowells/capture pads. In other embodiments, the clustering primers are located inside a plurality or array of first nanowells, while the DNA binding regions are located inside a plurality or array of second nanowells that are smaller in size than the first nanowells, creating a well-within a well configuration. As such, the area within the first nanowell is considered to be an interstitial region of the second nanowell. In addition, the array of first nanowells are also separated by interstitial regions.

As used herein, the terms "nucleic acid" and "nucleotide" are intended to be consistent with their use in the art and to include naturally occurring species or functional analogs thereof. Particularly useful functional analogs of nucleic acids are capable of hybridizing to a nucleic acid in a sequence specific fashion or capable of being used as a template for replication of a particular nucleotide sequence. Naturally occurring nucleic acids generally have a backbone containing phosphodiester bonds. An analog structure can have an alternate backbone linkage including any of a variety of those known in the art. Naturally occurring nucleic acids generally have a deoxyribose sugar (e.g., found in deoxyribonucleic acid (DNA)) or a ribose sugar (e.g., found in ribonucleic acid (RNA)). A nucleic acid can contain nucleotides having any of a variety of analogs of these sugar moieties that are known in the art. A nucleic acid can include native or non-native nucleotides. In this regard, a native deoxyribonucleic acid can have one or more bases selected from the group consisting of adenine, thymine, cytosine or guanine and a ribonucleic acid can have one or more bases selected from the group consisting of uracil, adenine, cytosine or guanine. Useful non-native bases that can be included in a nucleic acid or nucleotide are known in the art. The terms "probe" or "target," when used in reference to a nucleic acid, are intended as semantic identifiers for the nucleic acid in the context of a method or composition set forth herein and does not necessarily limit the structure or function of the nucleic acid beyond what is otherwise explicitly indicated. The terms "probe" and "target" can be similarly applied to other analytes such as proteins, small molecules, cells, or the like.

As used herein, the term "surface" is intended to mean an external part or external layer of a solid support or gel material. The surface can be in contact with another material such as a gas, liquid, gel, polymer, organic polymer, second surface of a similar or different material, metal, or coat. The surface, or regions thereof, can be substantially flat or planar. The surface can have surface contours such as wells, pits, channels, ridges, raised regions, pegs, posts or the like.

As used herein, the term "depression" refers to a discrete concave feature in a patterned support having a surface opening that is completely surrounded by interstitial region (s) of the patterned support surface. Depressions can have any of a variety of shapes at their opening in a surface including, as nonlimiting examples, round, elliptical, square, polygonal, star shaped (with any number of vertices), etc. The cross-section of a depression taken orthogonally with the surface can be curved, square, polygonal, hyperbolic, conical, angular, stepped etc. For example, the nanowell described herein are considered as a depression.

As used herein, the "solid support" or "substrate" may be used interchangeably and both refer to a rigid substrate that is insoluble in aqueous liquid. The substrate can be non-porous or porous. The solid support can optionally be capable of taking up a liquid (e.g., due to porosity) but will typically be sufficiently rigid that the substrate does not swell substantially when taking up the liquid and does not contract substantially when the liquid is removed by drying. A nonporous solid support is generally impermeable to liquids or gases. Exemplary solid supports include, but are not limited to, glass and modified or functionalized glass, plastics (e.g., acrylics, polystyrene and copolymers of styrene and other materials, polypropylene, polyethylene, polybutylene, polyurethanes, Teflon™, cyclic olefins, polyimides, etc.), nylon, ceramics, resins, Zeonor, silica or silica-based materials including silicon and modified silicon, carbon, metals, inorganic glasses, optical fiber bundles, and polymers. A particularly useful material is glass. Other suitable substrate materials may include polymeric materials, plastics, silicon, quartz (fused silica), boro float glass, silica, silica-based materials, carbon, metals including gold, an optical fiber or optical fiber bundles, sapphire, or plastic materials, for example COCs and epoxies. The particular material can be selected based on properties desired for a particular use. For example, materials that are transparent to a desired wavelength of radiation are useful for analytical techniques that will utilize radiation of the desired wavelength, such as one or more of the techniques set forth herein. Conversely, it may be desirable to select a material that does not pass radiation of a certain wavelength (e.g. being opaque, absorptive or reflective). This can be useful for formation of a mask to be used during manufacture of the structured substrate; or to be used for a chemical reaction or analytical detection carried out using the structured substrate. Other properties of a material that can be exploited are inertness or reactivity to certain reagents used in a downstream process; or ease of manipulation or low cost during a manufacturing process manufacture. Further examples of materials that can be used in the structured substrates or methods of the present disclosure are described in US Pat. App. Pub. No. 2012/0316086 A1 and 2013/0116153, each of which is incorporated herein by reference.

As used herein, the term "well" refers to a discrete contour in a solid support having a surface opening that is completely surrounded by interstitial region(s) of the surface. Wells can have any of a variety of shapes at their opening in a surface including but not limited to round, elliptical, square, polygonal, star shaped (with any number of vertices), etc. The cross section of a well taken orthogonally with the surface can be curved, square, polygonal, hyperbolic, conical, angular, etc. In some embodiments, the well is a microwell or a nanowell.

As used herein, the term "clustering oligonucleotide" or "clustering primer" refers to nucleotide sequence immobilized on the surface of the solid support used for amplifying the template polynucleotides to create identical copies of the same templates (i.e., clusters). Examples of clustering oligonucleotide may include but not limited to P5 primer, P7 primer, P15 primer, P17 primer as described herein. In some embodiments, the "clustering primer" is also referred to as a "surface primer."

The P5 and P7 primers are used on the surface of commercial flow cells sold by Illumina Inc. for sequencing on the Specific examples of suitable primers include P5 and/or P7 primers, which are used on the surface of commercial flow cells sold by Illumina, Inc., for sequencing on HiSeq™, HiSeqX™, MiSeq™, MiSeqDX™, MiniSeq™, NextSeq™, NextSegDX™, NovaSeq™, Genome Analyzer™, ISEQ™, and other instrument platforms. These primers are also referred to as the clustering primers or clustering oligonucleotides. The primer sequences are described in U.S. Pat. Pub. No. 2011/0059865 A1, which is incorporated herein by reference. The P5 and P7 primer sequences comprise the following:

```
Paired end set:
P5: paired end 5'→ 3'
SEQ ID NO. 1: AATGATACGGCGACCACCGAGAUCTACAC

P7: paired end 5'→ 3'
SEQ ID NO. 2: CAAGCAGAAGACGGCATACGAGAT

Single read set:
P5: single read: 5'→ 3'
SEQ ID NO. 3: AATGATACGGCGACCACCGA

P7: single read 5'→ 3'
SEQ ID NO. 4: CAAGCAGAAGACGGCATACGA
```

In some embodiments, the P5 and P7 primers may comprise a linker or spacer at the 5' end. Such linker or spacer may be included in order to permit cleavage, or to confer some other desirable property, for example to enable covalent attachment to a polymer or a solid support, or to act as spacers to position the site of cleavage an optimal distance from the solid support. In certain cases, 10-50 spacer nucleotides may be positioned between the point of attachment of the P5 or P7 primers to a polymer or a solid support. In some embodiments polyT spacers are used, although other nucleotides and combinations thereof can also be used. TET is a dye labeled oligonucleotide having complementary sequence to the P5/P7 primers. TET can be hybridized to the P5/P7 primers on a surface; the excess TET can be washed away, and the attached dye concentration can be measured by fluorescence detection using a scanning instrument such as a Typhoon Scanner (General Electric). In addition to the P5/P7 primers, other non-limiting examples of the sequencing primer sequences such as P15/P17 primers have also been disclosed in U.S. Publication No. 2019/0352327. These additional clustering primers comprise the following:

```
P15: 5' → 3'
SEQ ID NO. 5: AATGATACGGCGACCACCGAGAT*CTACAC
```

where T* refers to an allyl modified T.

```
P17 primer 5'→ 3'
SEQ ID NO. 6: YYYCAAGCAGAAGACGGCATACGAGAT
```

where Y is a diol linker subject to chemical cleavage, for example, by oxidation with a reagent such as periodate, as disclosed in U.S. Publication No. 2012/0309634, which is incorporated by preference in its entirety.

As used herein, the term "orthogonal" in the context of creating a substrate, it is meant that two pairs of substances may each interact chemically with their respective partners but do not interact chemically with either substance of the other pair. For example, one pair of substances A and A' can react with each other. Another pair of substances B and B' can react with each other. However, A cannot react with either B or B'. In addition, A' also cannot react with either B or B'. Some examples herein disclose choosing materials such that the first substance of each pair is incorporated into the layering of the substrate and the second substance of each pair is selected for its ability to selectively interact with the first substance of each pair. For example, alkyne functional groups may be incorporated into a first layer of the substrate, which can react with a functionalized molecule (e.g., a hydrogel) containing azido functional groups. Amino functional groups may be incorporated into a second layer of the substrate, which can react with a functionalized molecule (e.g., a hydrogel) containing active ester groups, such as an N-hydroxysuccinimide (NHS) ester. As such, the alkyne group is orthogonal to both the amino group and the NHS ester. Similarly, azido group is also orthogonal to both the amino and the NHS ester.

It is to be understood that certain radical naming conventions can include either a mono-radical or a di-radical, depending on the context. For example, where a substituent requires two points of attachment to the rest of the molecule, it is understood that the substituent is a di-radical. For example, a substituent identified as alkyl that requires two points of attachment includes di-radicals such as $—CH_2—$, $—CH_2CH_2—$, $—CH_2CH(CH_3)CH_2—$, and the like. Other radical naming conventions clearly indicate that the radical is a di-radical such as "alkylene" or "alkenylene."

As used herein, "alkyl" refers to a straight or branched hydrocarbon chain that is fully saturated (i.e., contains no double or triple bonds). The alkyl group may have 1 to 30 carbon atoms (whenever it appears herein, a numerical range such as "1 to 30" refers to each integer in the given range; e.g., "1 to 30 carbon atoms" means that the alkyl group may consist of 1 carbon atom, 2 carbon atoms, 3 carbon atoms, etc., up to and including 30 carbon atoms, although the present definition also covers the occurrence of the term "alkyl" where no numerical range is designated). The alkyl group may be a larger size alkyl having 10 to 30 carbon atoms. The alkyl group may also be a medium size alkyl having 1 to 9 carbon atoms. The alkyl group could also be a lower alkyl having 1 to 6 carbon atoms. By way of example only, "$C_1$-$C_6$ alkyl" indicates that there are one to six carbon atoms in the alkyl chain, i.e., the alkyl chain is selected from the group consisting of methyl, ethyl, propyl, iso-propyl, n-butyl, iso-butyl, sec-butyl, and t-butyl. Typical alkyl groups include, but are in no way limited to, methyl, ethyl, propyl, isopropyl, butyl, isobutyl, tertiary butyl, pentyl, hexyl, and the like.

As used herein, "alkenyl" refers to a straight or branched hydrocarbon chain containing one or more double bonds. The alkenyl group may have 2 to 30 carbon atoms, although the present definition also covers the occurrence of the term "alkenyl" where no numerical range is designated. The alkenyl group may be a larger size alkenyl having 10 to 30 carbon atoms. The alkenyl group may also be a medium size alkenyl having 2 to 9 carbon atoms. The alkenyl group could also be a lower alkenyl having 2 to 6 carbon atoms. The alkenyl group may be designated as "$C_2$-$C_6$ alkenyl" or similar designations. By way of example only, "$C_2$-$C_6$ alkenyl" indicates that there are two to six carbon atoms in the alkenyl chain, i.e., the alkenyl chain is selected from the group consisting of ethenyl, propen-1-yl, propen-2-yl, propen-3-yl, buten-1-yl, buten-2-yl, buten-3-yl, buten-4-yl, 1-methyl-propen-1-yl, 2-methyl-propen-1-yl, 1-ethyl-ethen-1-yl, 2-methyl-propen-3-yl, buta-1,3-dienyl, buta-1,2,-dienyl, and buta-1,2-dien-4-yl. Typical alkenyl groups include, but are in no way limited to, ethenyl, propenyl, butenyl, pentenyl, and hexenyl, and the like.

As used herein, "alkynyl" refers to a straight or branched hydrocarbon chain containing one or more triple bonds. The alkynyl group may have 2 to 30 carbon atoms, although the present definition also covers the occurrence of the term "alkynyl" where no numerical range is designated. The alkynyl group may be a larger size alkynyl having 10 to 30 carbon atoms. The alkynyl group may also be a medium size alkynyl having 2 to 9 carbon atoms. The alkynyl group could also be a lower alkynyl having 2 to 6 carbon atoms. The alkynyl group may be designated as "$C_2$-$C_6$ alkynyl" or similar designations. By way of example only, "$C_2$-$C_6$ alkynyl" indicates that there are two to six carbon atoms in the alkynyl chain, i.e., the alkynyl chain is selected from the group consisting of ethynyl, propyn-1-yl, propyn-2-yl, butyn-1-yl, butyn-3-yl, butyn-4-yl, and 2-butynyl. Typical alkynyl groups include, but are in no way limited to, ethynyl, propynyl, butynyl, pentynyl, and hexynyl, and the like.

As used herein, "alkylene" means a branched, or straight chain fully saturated di-radical chemical group containing only carbon and hydrogen that is attached to the rest of the molecule via two points of attachment. The alkylene group may be a larger size alkylene having 10 to 30 carbon atoms. The alkylene group may also be a medium size alkylene having 1 to 9 carbon atoms. The alkylene group could also be a lower alkylene having 1 to 6 carbon atoms.

As used herein, "alkenylene" means a straight or branched chain di-radical chemical group containing only carbon and hydrogen and containing at least one carbon-carbon double bond that is attached to the rest of the molecule via two points of attachment. The alkenylene group may be a larger size alkenylene having 10 to 30 carbon atoms. The alkenylene group may also be a medium size alkenylene having 2 to 9 carbon atoms. The alkenylene group could also be a lower alkenylene having 2 to 6 carbon atoms.

As used herein, "alkynylene" means a straight or branched chain di-radical chemical group containing only carbon and hydrogen and containing at least one carbon-carbon triple bond that is attached to the rest of the molecule via two points of attachment. The alkynylene group may be a larger size alkynylene having 10 to 30 carbon atoms. The alkynylene group may also be a medium size alkynylene having 2 to 9 carbon atoms. The alkynylene group could also be a lower alkynylene having 2 to 6 carbon atoms.

The term "aromatic" refers to a ring or ring system having a conjugated pi electron system and includes both carbocyclic aromatic (e.g., phenyl) and heterocyclic aromatic groups (e.g., pyridine). The term includes monocyclic or fused-ring polycyclic (i.e., rings which share adjacent pairs of atoms) groups provided that the entire ring system is aromatic.

As used herein, "aryl" refers to an aromatic ring or ring system (i.e., two or more fused rings that share two adjacent carbon atoms) containing only carbon in the ring backbone. When the aryl is a ring system, every ring in the system is aromatic. The aryl group may have 6 to 18 carbon atoms, although the present definition also covers the occurrence of the term "aryl" where no numerical range is designated. In some embodiments, the aryl group has 6 to 10 carbon atoms. The aryl group may be designated as "$C_6$-$C_{10}$ aryl," "$C_6$ or $C_{10}$ aryl," or similar designations. Examples of aryl groups include, but are not limited to, phenyl, naphthyl, azulenyl, and anthracenyl. An aryl group may comprise one or more "substituents", as described herein.

As used herein, "arylene" refers to an aromatic ring or ring system containing only carbon and hydrogen that is attached to the rest of the molecule via two points of attachment.

As used herein, "heteroaryl" refers to an aromatic ring or ring system (i.e., two or more fused rings that share two adjacent atoms) that contain(s) one or more heteroatoms, that is, an element other than carbon, including but not limited to, nitrogen, oxygen and sulfur, in the ring backbone. When the heteroaryl is a ring system, every ring in the system is aromatic. The heteroaryl group may have 5-18 ring members (i.e., the number of atoms making up the ring backbone, including carbon atoms and heteroatoms), although the present definition also covers the occurrence of the term "heteroaryl" where no numerical range is designated. In some embodiments, the heteroaryl group has 5 to 10 ring members or 5 to 7 ring members. The heteroaryl group may be designated as "5-7 membered heteroaryl," "5-10 membered heteroaryl," or similar designations. Examples of heteroaryl rings include, but are not limited to, furyl, thienyl, phthalazinyl, pyrrolyl, oxazolyl, thiazolyl, imidazolyl, pyrazolyl, isoxazolyl, isothiazolyl, triazolyl, thiadiazolyl, pyridinyl, pyridazinyl, pyrimidinyl, pyrazinyl, triazinyl, quinolinyl, isoquinlinyl, benzimidazolyl, benzoxazolyl, benzothiazolyl, indolyl, isoindolyl, and benzothienyl. A heteroaryl group may comprise one or more "substituents", as described herein.

As used herein, "heteroarylene" refers to an aromatic ring or ring system containing one or more heteroatoms in the ring backbone that is attached to the rest of the molecule via two points of attachment.

As used herein, "heterocyclyl" means a non-aromatic cyclic ring or ring system containing at least one heteroatom in the ring backbone. Heterocyclyls may be joined together in a fused, bridged or spiro-connected fashion. Heterocyclyls may have any degree of saturation provided that at least one ring in the ring system is not aromatic. The heteroatom(s) may be present in either a non-aromatic or aromatic ring in the ring system. The heterocyclyl group may have 3 to 20 ring members (i.e., the number of atoms making up the ring backbone, including carbon atoms and heteroatoms), although the present definition also covers the occurrence of the term "heterocyclyl" where no numerical range is designated. The heterocyclyl group may also be a medium size heterocyclyl having 3 to 10 ring members. The heterocyclyl group could also be a heterocyclyl having 3 to 6 ring members. The heterocyclyl group may be designated as "3-6 membered heterocyclyl" or similar designations. In preferred six membered monocyclic heterocyclyls, the heteroatom(s) are selected from one up to three of O, N or S, and in preferred five membered monocyclic heterocyclyls, the heteroatom(s) are selected from one or two heteroatoms selected from O, N, or S. Examples of heterocyclyl rings include, but are not limited to, azepinyl, acridinyl, carbazolyl, cinnolinyl, dioxolanyl, imidazolinyl, imidazolidinyl, morpholinyl, oxiranyl, oxepanyl, thiepanyl, piperidinyl, piperazinyl, dioxopiperazinyl, pyrrolidinyl, pyrrolidonyl, pyrrolidionyl, 4-piperidonyl, pyrazolinyl, pyrazolidinyl, 1,3-dioxinyl, 1,3-dioxanyl, 1,4-dioxinyl, 1,4-dioxanyl, 1,3-oxathianyl, 1,4-oxathiinyl, 1,4-oxathianyl, 2H-1,2-oxazinyl, trioxanyl, hexahydro-1,3,5-triazinyl, 1,3-dioxolyl, 1,3-dioxolanyl, 1,3-dithiolyl, 1,3-dithiolanyl, isoxazolinyl, isoxazolidinyl, oxazolinyl, oxazolidinyl, oxazolidinonyl, thiazolinyl, thiazolidinyl, 1,3-oxathiolanyl, indolinyl, isoindolinyl, tetrahydrofuranyl, tetrahydropyranyl, tetrahydrothiophenyl, tetrahydrothiopyranyl, tetrahydro-1,4-thiazinyl, thiamorpholinyl, dihydrobenzofuranyl, benzimidazolidinyl, and tetrahydroquinoline. A heterocyclyl group may comprise one or more "substituents", as described herein.

As used herein, "cycloalkenyl" or "cycloalkene" means a carbocyclyl ring or ring system having at least one double bond, wherein at least one ring in the ring system is non-aromatic. An example is cyclohexenyl or cyclohexene. Another example is norbornene or norbornenyl. A non-aromatic cycloalkenyl group may further fuse with one or more aromatic rings.

As used herein, "cycloalkynyl" or "cycloalkyne" means a carbocyclyl ring or ring system having at least one triple bond, wherein at least one ring in the ring system is non-aromatic. An example is cyclooctyne. Another example is bicyclononyne. A cycloalkynyl group may further fuse with one or more aromatic rings. For example, cyclooctyne may further fuse with two phenyl groups to form dibenzocyclooctyne (DBCO).

As used herein, the term "amino" refers to a "—$NR_AR_B$" group in which $R_A$ and $R_B$ are each independently selected from hydrogen, $C_{1-6}$ alkyl, $C_{2-6}$ alkenyl, $C_{2-6}$ alkynyl, $C_{3-7}$ carbocyclyl, $C_{6-10}$ aryl, 5-10 membered heteroaryl, and 5-10 membered heterocyclyl, as defined herein. A non-limiting example includes free amino (i.e., —$NH_2$).

As used herein, the term "azido" refers to a —$N_3$ group.

As used herein, the term "carboxyl" refers to a —C(═O)OH group.

As used herein, the term "thiol" refers to a —SH group.

As used herein, "vinyl" refers to a —CH═$CH_2$ group.

As used herein, the term "tetrazine" or "tetrazinyl" refers to six-membered heteroaryl group comprising four nitrogen atoms. Tetrazine can be optionally substituted.

As used herein, the term "hydrazine" or "hydrazinyl" refers to a —$NHNH_2$ group.

As used herein, the term "formyl" or "aldehyde" as used herein refers to a —C(O)H group.

As used herein, the term "epoxy" as used herein refers to

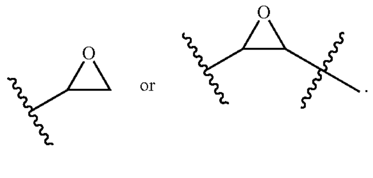

As used herein, the term "glycidyl" as used herein refers to

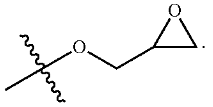 [SMILES: *OCC1CO1]

As used herein, the term "N-hydroxysuccinimide" group or "NHS" group comprises the structure:

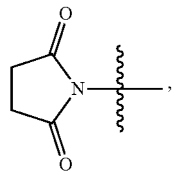 [SMILES: *N1C(=O)CCC1=O]

or an optionally substituted analog thereof (such as sulfo-NHS).

As used herein, a "NHS ester" group comprises the structure:

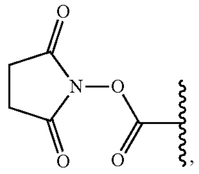 [SMILES: *C(=O)ON1C(=O)CCC1=O]

or an optionally substituted analog thereof.

When a group is described as "optionally substituted" it may be either unsubstituted or substituted. Likewise, when a group is described as being "substituted", the substituent may be selected from one or more of the indicated substituents. As used herein, a substituted group is derived from the unsubstituted parent group in which there has been an exchange of one or more hydrogen atoms for another atom or group. Unless otherwise indicated, when a group is deemed to be "substituted," it is meant that the group is substituted with one or more substituents independently selected from $C_1$-$C_6$ alkyl, $C_1$-$C_6$ alkenyl, $C_1$-$C_6$ alkynyl, $C_1$-$C_6$ heteroalkyl, $C_3$-$C_7$ carbocyclyl (optionally substituted with halo, $C_1$-$C_6$ alkyl, $C_1$-$C_6$ alkoxy, $C_1$-$C_6$ haloalkyl, and $C_1$-$C_6$ haloalkoxy), $C_3$-$C_7$carbocyclyl-$C_1$-$C_6$-alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), 3-10 membered heterocyclyl (optionally substituted with halo, $C_1$-$C_6$ alkyl, $C_1$-$C_6$ alkoxy, $C_1$-$C_6$ haloalkyl, and $C_1$-$C_6$ haloalkoxy), 3-10 membered heterocyclyl-$C_1$-$C_6$-alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), aryl (optionally substituted with halo, $C_1$-$C_6$ alkyl, $C_1$-$C_6$ alkoxy, $C_1$-$C_6$ haloalkyl, and $C_1$-$C_6$ haloalkoxy), (aryl)$C_1$-$C_6$ alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heteroaryl (optionally substituted with halo, $C_1$-$C_6$ alkyl, $C_1$-$C_6$ alkoxy, $C_1$-$C_6$ haloalkyl, and $C_1$-$C_6$ haloalkoxy), (5-10 membered heteroaryl)$C_1$-$C_6$ alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), halo, —CN, hydroxy, $C_1$-$C_6$ alkoxy, ($C_1$-$C_6$ alkoxy)$C_1$-$C_6$ alkyl, —O($C_1$-$C_6$ alkoxy)$C_1$-$C_6$ alkyl; ($C_1$-$C_6$ haloalkoxy)$C_1$-$C_6$ alkyl; —O($C_1$-$C_6$ haloalkoxy)$C_1$-$C_6$ alkyl; aryloxy, sulfhydryl (mercapto), halo($C_1$-$C_6$)alkyl (e.g., —$CF_3$), halo($C_1$-$C_6$)alkoxy (e.g., —$OCF_3$), $C_1$-$C_6$ alkylthio, arylthio, amino, amino($C_1$-$C_6$)alkyl, nitro, O-carbamyl, N-carbamyl, O-thiocarbamyl, N-thiocarbamyl, C-amido, N-amido, S-sulfonamido, N-sulfonamido, C-carboxy, O-carboxy, acyl, cyanato, isocyanato, thiocyanato, isothiocyanato, sulfinyl, sulfonyl, —$SO_3H$, sulfonate, sulfate, sulfino, —$OSO_2C_{1-4}$ alkyl, monophosphate, diphosphate, triphosphate, and oxo (=O). Wherever a group is described as "optionally substituted" that group can be substituted with the above substituents.

The embodiments set forth herein and recited in the claims can be understood in view of the above definitions.

Polish-Free Manufacturing Methods

In one aspect, the present disclosure provides a method for functionalizing the surface of a substrate (e.g., a flow cell) that avoid a polishing step. It may be advantageous to eliminate a polishing step from a flow cell processing workflow to avoid the additional time, effort, and quality control that such a step typically involves. The polish-free process described herein creates a patterned substrate with two or more nanodomains with orthogonal chemical functionalities. For example, a first nanodomain may be situated within a nanowell or on a nanocolumn while a second nanodomain is situated in the interstitial space between the nanowells or nanocolumns. Because the two nanodomains are orthogonal, under the same conditions the first nanodomain may be reactive (and may thus be functionalized), even while the second nanodomain is not reactive. This selective reactivity may allow DNA clustering located exclusively at the pre-defined locations—namely, in the first nanodomain. The simplified surface functionalization process may significantly reduce cost reduction benefits for flow cell manufacturing.

In some embodiments, the polish-free method of patterning a surface of a substrate may comprise:

- contacting a stamp comprising a plurality of microscale or nanoscale patterns with a multi-layer stack positioned over a base support of a substrate, wherein the multi-layer stack comprises a first layer positioned over the base support and a second layer positioned over the first layer;
- imprinting through the second layer to create a plurality of depressions and expose a surface of the first layer; and
- contacting the surface of the first layer with a functionalized hydrogel to form covalent bonding between the first layer and the functionalized hydrogel;
- wherein the first layer of the multi-layer stack comprises a first polymer having a plurality of first functional groups selected from the group consisting of an amino, an alkynyl, a cycloalkenyl, a cycloalkynyl, a carboxyl, a vinyl, and a thiol,
- wherein the second layer of the multi-layer stack comprises a second polymer having a plurality of second functional groups selected from the group consisting of an amino, an alkynyl, a cycloalkenyl, a cycloalkynyl, a carboxyl, a vinyl, and a thiol, and the second functional groups are orthogonal to the first functional groups.

In some examples, layers within a flow cell surface may include orthogonal chemistries to enable selective reactions involving each layer. For example, there may be a high orthogonality between the Cu(I) click chemistry on alkynyl groups and the N-hydroxysuccinimide (NHS) chemistry on amino groups. Combinations of orthogonal functionalities is further discussed in Im et al., *Patterning Nanodomains with*

*Orthogonal Functionalities: Solventless Synthesis of Self-Sorting Surfaces*, JACS 2008, incorporated herein by reference.

In some embodiments of the method described herein, each of the first and the second polymer may have functional groups selected from the group consisting of an amino and an alkynyl. In further embodiments, the first layer of the multi-layer stack comprises amino groups (e.g., poly(allylamine), PAAm), and the second layer the second layer of the multi-layer stack comprises alkynyl groups (e.g., poly (propargyl methacrylate), PPMA). In some such embodiments, the functionalized hydrogel comprises activated carboxyl groups in the form of NHS ester groups that form amide bonds with the amino groups of the polymer (e.g., PAAm) in the first layer. PAAm comprises a structure of

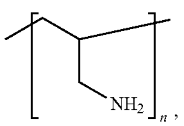

including an amino functional group, which may react with a functionalize hydrogel with NHS ester functional groups to form covalent bonding between the functionalized hydrogel and PAAm. A non-limiting example of such a reaction is illustrated in Scheme 1 below.

Scheme 1. Illustration of an NHS reaction involving Paam

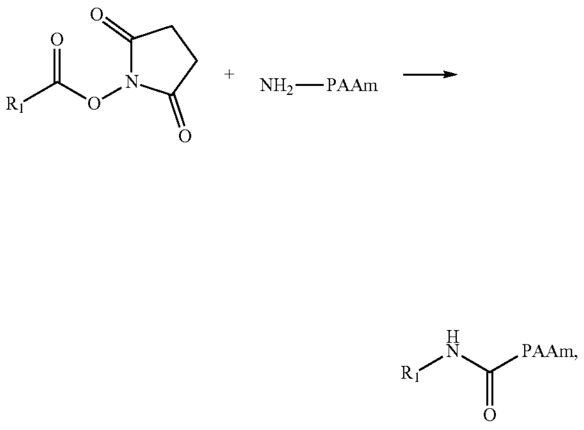

wherein $R^1$ represents the remaining of the functionalized hydrogel comprising the NHS ester group.

In some other embodiments of the method described herein, the first layer of the multi-layer stack comprises alkynyl groups (e.g., PPMA), and the second layer the second layer of the multi-layer stack comprises amino groups (e.g., PAAm). In some such embodiments, the functionalized hydrogel comprises azido groups that form triazoline bonds with the alkynyl groups (also known as acetylene) of the polymer (e.g., PPMA) in the first layer. In some further embodiments, the functionalized hydrogel comprises polyacrylamide or modified derivatives thereof. In some such embodiments, the azido containing functionalized hydrogel comprises poly(N-(5-azidoacetamidylpentyl)acrylamide-co-acrylamide) (PAZAM). PPMA has a structure of

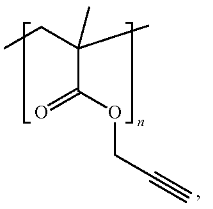

including an alkynyl functional group which may react with a functionalized hydrogel with azido functional groups. A non-limiting example of such a reaction is illustrated in Scheme 2 below.

Scheme 2. Illustration of Cu(I) click reaction involving PPMA

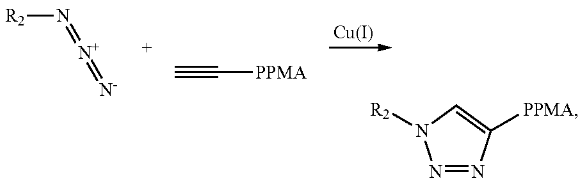

wherein $R^2$ represents the remaining of the functionalized hydrogel comprising the azido group.

Though PAAm and PPMA are described as components of the bottom and/or top layer in the example workflows below, different materials or combinations of materials may be used in creating the first and second layer. Disclosed herein are several combinations of materials having orthogonal chemistries which may be included in a polish-free substrate. For example, the alkynyl group may be contained in a cycloalkynyl (e.g., dibenzocyclooctyl DBCO

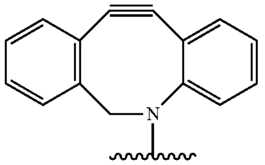 [SMILES: *N1Cc2ccccc2C#Cc2ccccc21]

or bicyclononyne BCN

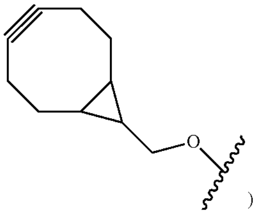 [SMILES: *OCC1C2CCC#CCCC21]

to facilitate a strain-promoted 1,3-dipolar cycloaddition reaction (SPAAC). In addition, cycloalkene such as norbornene may also be used in the SPAAC reaction with azido containing material. Non-limiting examples also include the combination of thiol-ene coupling/copper free SPAAC reaction; EDC/NHS activated carboxyl and amino coupling/thiol-ene coupling; copper free SPAAC/thiol-ene coupling; and terminal alkene hydroboration/internal alkene thiol-ene coupling.

In some embodiments of the method described herein, wherein the multi-layer stack is prepared by: depositing the first polymer on the base support of the substrate to form the first layer; and depositing the second polymer over the first layer to form the second layer. In some instances, the depositing of the first or second polymer is by chemical vapor deposition (CVD) or spin coating.

In some embodiments of the method described herein, wherein the depressions comprise swaths, fiducials, lanes, or wells, or combination thereof. In further embodiments, the depressions comprise wells. In further embodiments, the well may comprise a volume between about $1\times10^{-3}$ $\mu m^3$ and $1\times10^{3}$ $\mu m^3$. In further embodiments, the well may comprise a depth between about 0.1 μm and $1\times10^{3}$ μm. In further embodiments, the well may comprise an opening comprising a surface area between about $1\times10^{-3}$ $\mu m^2$ and $1\times10^{3}$ $\mu m^2$. In some embodiments, the patterned substrate may comprise at least 1,000,000, 2,000,000, 3,000,000, 4,000,000, or 5,000,000 spatially distinguishable depressions.

In further embodiments of the method, the method may further comprise grafting oligonucleotides or polynucleotides (e.g., DNA oligos) to the functionalized hydrogel.

In any embodiments of the method described herein, the method does not include a polishing step to remove the excess functionalized hydrogel.

In any embodiments of the method described herein, when the first or the second layer comprises a plurality of carboxyl groups, the carboxyl groups may be in an activated form such as an active ester such that the activated carboxyl groups react with amino groups to form amide bonds.

Functionalized Hydrogels

In some embodiments, the functionalized hydrogel described herein may comprise two or more recurring monomer units in any order or configuration, and may be linear, cross-linked, or branched, or a combination thereof. In an example, the polymer may be a heteropolymer and the heteropolymer may include an acrylamide monomer, such as

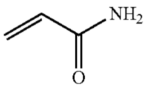

or a substituted analog thereof. The polymer or hydrogel may be coated on the surface either by covalent or non-covalent attachment.

In some embodiments, the hydrogel comprises the repeating units of:

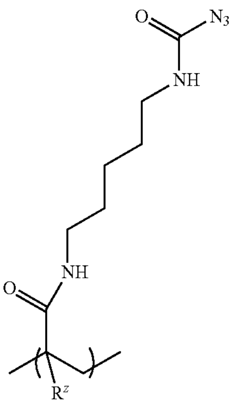

and optionally

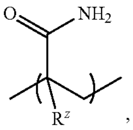

, where each $R^z$ is independently H or $C_{1-4}$ alkyl. In an example, a polymer used may include examples such as a poly(N-(5-azidoacetamidylpentyl)acrylamide-co-acrylamide), also known as PAZAM:

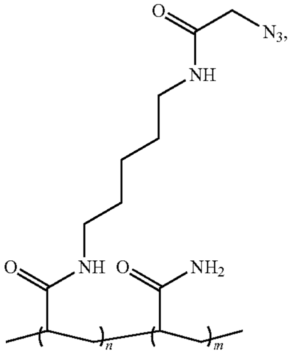

wherein n is an integer in the range of 1-20,000, and m is an integer in the range of 1-100,000. In some examples, the acrylamide monomer may include an azido acetamido pentyl acrylamide monomer:

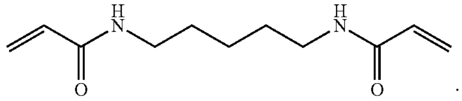

.

In some examples, the hydrogel may comprise repeating units of

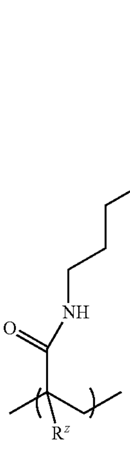

and

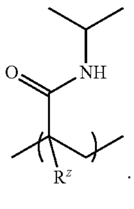

.

In further embodiments, the hydrogel may comprise the structure:

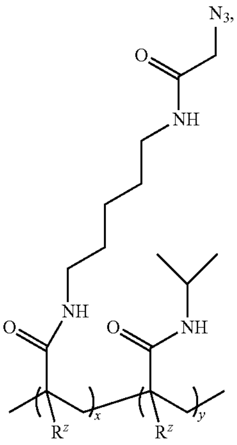

wherein x is an integer in the range of 1-20,000, and y is an integer in the range of 1-100,000, or

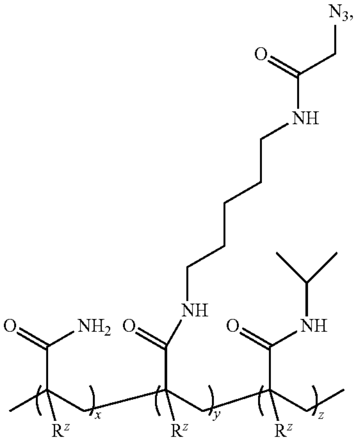

wherein y is an integer in the range of 1-20,000 and x and z are integers wherein the sum of x and z may be within a range of from 1 to 100,000, where each $R^z$ is independently H or $C_{1-4}$ alkyl and a ratio of x:y may be from approximately 10:90 to approximately 1:99, or may be approximately 5:95, or a ratio of (x:y):z may be from approximately 85:15 to approximately 95:5, or may be approximately 90:10 (wherein a ratio of x:(y:z) may be from approximately 1:(99) to approximately 10:(90), or may be approximately 5:(95)), respectively.

In an example, the polymeric hydrogel includes an acrylamide copolymer, such as PAZAM. The molecular weight of PAZAM and other forms of the acrylamide copolymer may range from about 5 kDa to about 1500 kDa or from about 10 kDa to about 1000 kDa, or may be, in a specific example, about 312 kDa. In some examples, PAZAM and other forms of the acrylamide copolymer are linear polymers. In some other examples, PAZAM and other forms of the acrylamide copolymer are a lightly cross-linked polymers.

As still another example, the hydrogel may include a recurring unit of each of structure (III) and (IV):

(III)

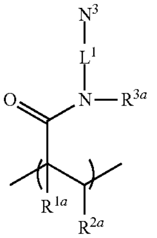

and (IV)

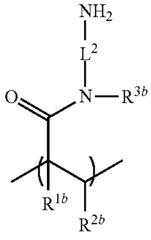

wherein each of $R^{1a}$, $R^{2a}$, $R^{1b}$ and $R^{2b}$ is independently selected from hydrogen, an optionally substituted alkyl or optionally substituted phenyl; each of $R^{3a}$ and $R^{3b}$ is independently selected from hydrogen, an optionally substituted alkyl, an optionally substituted phenyl, or an optionally substituted $C_7$-$C_{14}$ aralkyl; and each $L^1$ and $L^2$ is independently selected from an optionally substituted alkylene linker or an optionally substituted heteroalkylene linker.

Figure 1B:
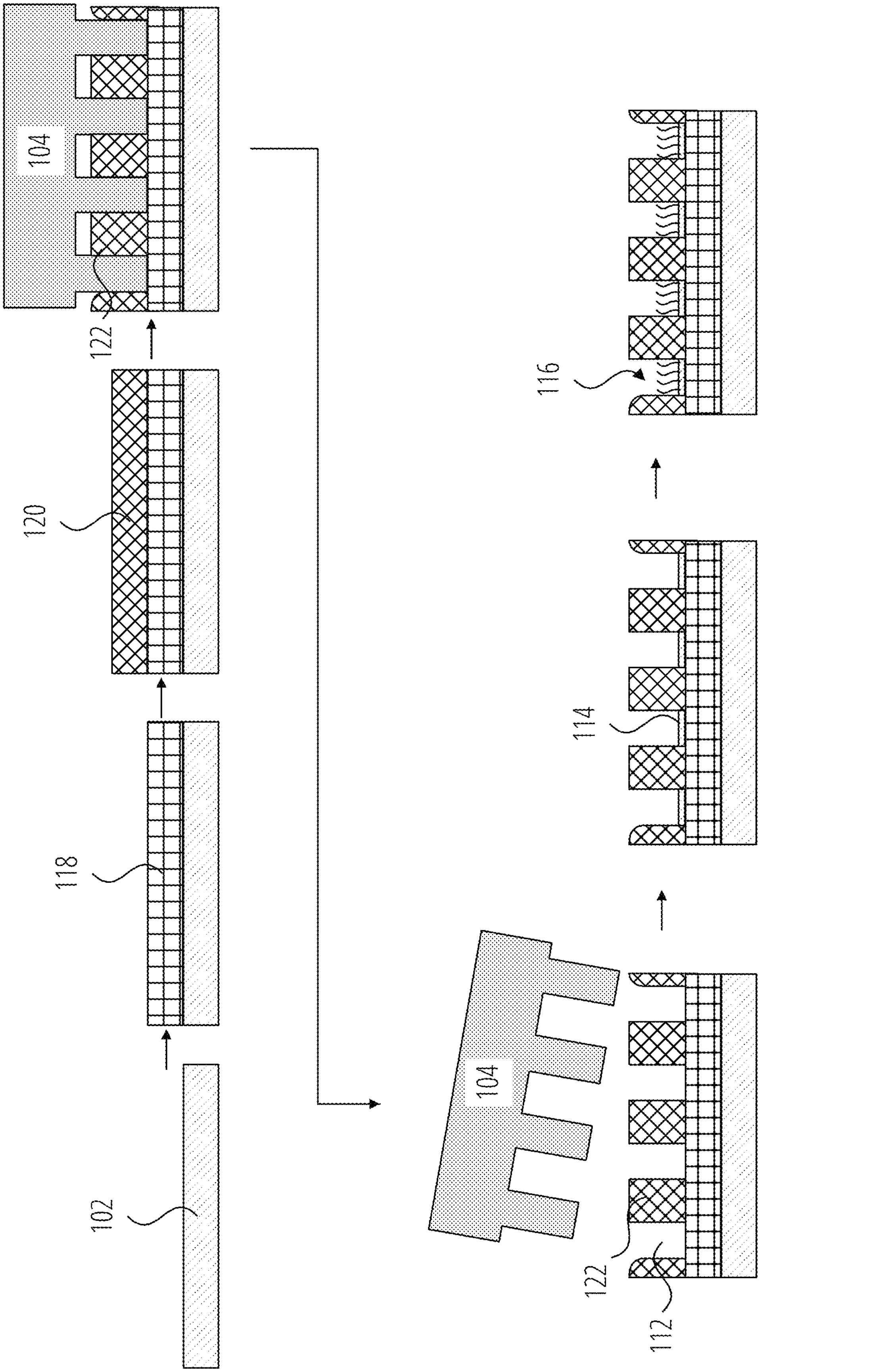
FIG. 1B schematically illustrates a second example of a polish-free workflow to prepare a patterned substrate according to an embodiment of the present disclosure.

In some examples, as illustrated in FIG. 1A and FIG. 1B, polish-free workflows may be used to create a substrate (e.g., a flow cell) including functionalized nanowells. In certain examples, there may be two layers stacked on a base support. The top and bottom layers may include PAAm and/or PPMA, for example. Other materials having orthogonal reactivities may be used, however. In the examples discussed herein, the Cu(I) click reaction and/or NHS ester reaction with amino may be used within a workflow to prepare multifunctional nanopatterned surfaces based on these orthogonal chemistries.

Example Polish-Free Workflow 1

FIG. 1A diagrams an example polish-free workflow for creating a flow cell surface. A first layer of PAAm 106 may be synthesized onto a base support 102. The base support 102 may include any suitable material. Examples of suitable materials include epoxy siloxane, glass and modified or functionalized glass, plastics (including acrylics, polystyrene and copolymers of styrene and other materials, polypropylene, polyethylene, polybutylene, polyurethanes, polytetrafluoroethylene (such as TEFLON® from Chem ours), cyclic olefins/cyclo-olefin polymers (COP) (such as ZEONOR® from Zeon), polyimides, etc.), nylon, ceramics/ceramic oxides, silica, fused silica, or silica-based materials, aluminum silicate, silicon and modified silicon (e.g., boron doped p+ silicon), silicon nitride ($Si_3N_4$), silicon oxide ($SiO_2$), tantalum pentoxide ($Ta_2Os$) or other tantalum oxide (s) (TaOx), hafnium oxide ($HfO_2$), carbon, metals, inorganic glasses, or the like. The base support 102 may also be a multi-layered structure. Some examples of the multi-layered structure include glass or silicon, with a coating layer of tantalum oxide or another ceramic oxide at the surface. Still other examples of the multi-layered structure may include a silicon-on-insulator (SOI) substrate.

In an example, the method of synthesizing the first layer of PAAm 106 may be any suitable method. For example, suitable methods may include spin coating or CVD, including plasma-enhanced chemical vapor deposition (PECVD). PECVD may be desirable to synthesize a first layer of PAAm 106 because PECVD may allow for a high degree of cross-linking within the PAAm.

Over the first layer of PAAm 106, a second layer of PPMA 108 may be synthesized. It may be advantageous for the second layer of PPMA 108 to be thin, non-crosslinked and/or minimally crosslinked such that it can deform in response to contact with working stamp 104 in a subsequent step. When synthesizing the second layer of PPMA 108, it may be desirable to avoid methods involving solvents, as a solvent may dissolve the first layer of PAAm 106. For example, desirable methods may include spin coating or CVD, including initiated chemical vapor deposition (iCVD). iCVD, a solventless method, may ensure that the first layer of PAAm 106 does not dissolve during synthesis of second layer of PPMA 108.

A working stamp 104 may press against the bilayer structure. The working stamp 104 may include any suitable material, for example PDMS or polyurethane. The dimensions and geometry of working stamp 104 may affect the final dimensions and geometry of the imprinted PPMA second layer 110. At certain combinations of temperature and pressure, the second layer of PPMA 108 may be deformed by contact with the working stamp 104 to form an imprinted PPMA second layer 110. As an example, the second layer of PPMA 108 may deform at a temperature of 105° C. and a pressure of 0.1 bar. This example is used for illustrative purposes; other combinations of temperature and pressure may be used. Thickness of the second layer of PPMA 108 may affect whether a pattern in imprinted PPMA second layer 110 is formed without a residual PPMA layer over the first layer of PAAm 106. For example, a thickness of 50 nm of second layer of PPMA 108 may allow for pattern formation without a residual PPMA layer covering the first layer of PAAm 106. This example thickness is provided solely for illustrative purposes; other thicknesses may be used. The working stamp 104 may be pressed into the imprinted PAAm second layer 122 for a particular length of time. For example, at a temperature of 105° C. and a pressure of 0.1 bar, pressing for 30 minutes may be adequate to set the imprinted PPMA second layer 110. This duration is provided solely for illustrative purposes; other pressing durations may be used.

The working stamp 104 may be removed from imprinted PPMA second layer 110 and base support 102, first layer of PAAm 106 and imprinted PPMA second layer 110 may return to ambient temperature and pressure. The imprinted PPMA second layer 110 may retain aspects of the shape imposed on it by the working stamp 104. Aspects of shape imposed onto imprinted PPMA second layer 110 by working stamp 104 may include a depression. The depression may include, for example, one or more nanowell 112. In certain embodiments, the volume of the nanowell 112 is between approximately $1\times10^{-3}$ μm$^3$ and $1\times10^{4}$ μm$^3$, between approximately $1\times10^{-2}$ μm$^3$ and $1\times10^{3}$ μm$^3$, between approximately $1\times10^{-1}$ μm$^3$ and $1\times10^{2}$ μm$^3$, between approximately 1 μm$^3$ and 10 μm$^3$, or any value or range within or bounded by any of these ranges or values, although values outside these values or ranges can be used in some cases. In certain embodiments, the depth of the nanowell 112 ranges between approximately 0.1 μm and $1\times10^{3}$ μm, approximately 1 μm and $1\times10^{2}$ μm, approximately 5 μm and 50 μm, or any value or range within or bounded by any of these ranges or values, although values outside these values or ranges can be used in some cases. In certain embodiments, the opening of nanowell 112 includes a surface area between approximately $1\times10^{-3}$ μm$^2$ and $1\times10^{3}$ μm$^2$, $1\times10^{-2}$ μm$^2$ and $1\times10^{2}$ μm$^2$, 0.1 μm$^2$ and 10 μm$^2$, 1 μm$^2$ and 5 μm$^2$, or any value or range within or bounded by any of these ranges or values, although values outside these values or ranges can be used in some cases.

The nanowell 112 may include orthogonally functional nanodomains with alkynyl and amino functionalities, for example, nanodomains including the exposed surfaces of the imprinted PPMA second layer 110 and the first layer of PAAm 106, respectively. In this example, the bottom of the nanowell 112 includes a surface of the first layer of PAAm 106, and nanowells are separated by interstitials including the imprinted PPMA second layer 110. The depressions imprinted into the second layer of PPMA 108 is not restricted to just nanowells; it may include other features or patterns. Because the dimensions and the geometry of the top layer pattern may be dictated by the mold, stamp designs including nanowells, swaths, fiducials, and/or lanes may also be imprinted with this method.

The nanopatterned base support may undergo a further functionalization step to create orthogonally tagged nanodomains. For example, a functionalized layer 114 may be selectively synthesized to the exposed surface of first layer of PAAm 106 via an NHS ester and amino reaction. The functionalized hydrogel layer 114 may include any suitable material. The functionalized layer 114 may be any gel material that can swell when liquid is taken up and can contract when liquid is removed, e.g., by drying. In an example, the gel material is a polymeric hydrogel.

The functionalized hydrogel may include, for example, a polyacrylamide copolymer. One example of a functionalized hydrogel including a polyacrylamide copolymer is a PAZAM-type hydrogel. A PAZAM-type hydrogel may include functional groups. For example, a PAZAM-type hydrogel may include an NHS ester-functionalized PAZAM-type hydrogel, which may bind to first layer of PAAm 106 directly. Alternatively, functionalized layer 114 may bind to the first layer of PAAm 106 via bi-functional NHS-norbornene linker which in turn binds to a hydrogel, such as a PAZAM-type hydrogel containing azido groups. Generally, NHS ester reactions with amino may be chemically orthogonal to functional groups of PPMA, so the surface of imprinted PPMA second layer 110 would not bind to the functionalized layer 114 and may thus remain unfunctionalized.

It is to be understood that other molecules may be used to form the functionalized layer 114, as long as they are functionalized to graft oligonucleotide primers thereto. Other examples of suitable functionalized layers include those having a colloidal structure, such as agarose; or a polymer mesh structure, such as gelatin; or a cross-linked polymer structure, such as polyacrylamide polymers and copolymers, silane free acrylamide (SFA), or an azidolyzed version of SFA. Examples of suitable polyacrylamide polymers may be synthesized from acrylamide and an acrylic acid or an acrylic acid containing a vinyl group, or from monomers that form [2+2] cycloaddition reactions. Still other examples of suitable initial polymeric hydrogels include mixed copolymers of acrylamides and acrylates. A variety of polymer architectures containing acrylic monomers (e.g., acrylamides, acrylates etc.) may be utilized in the examples disclosed herein, such as branched polymers, including star polymers, star-shaped or star-block polymers, dendrimers, and the like. For example, the monomers (e.g., acrylamide, acrylamide containing the catalyst, etc.) may be incorporated, either randomly or in block, into the branches (arms) of a star-shaped polymer.

The gel material of the functionalized layer 114 may be formed using any suitable copolymerization process. The functionalized layer 114 may also be deposited using any of the methods disclosed herein.

Figure 3A:
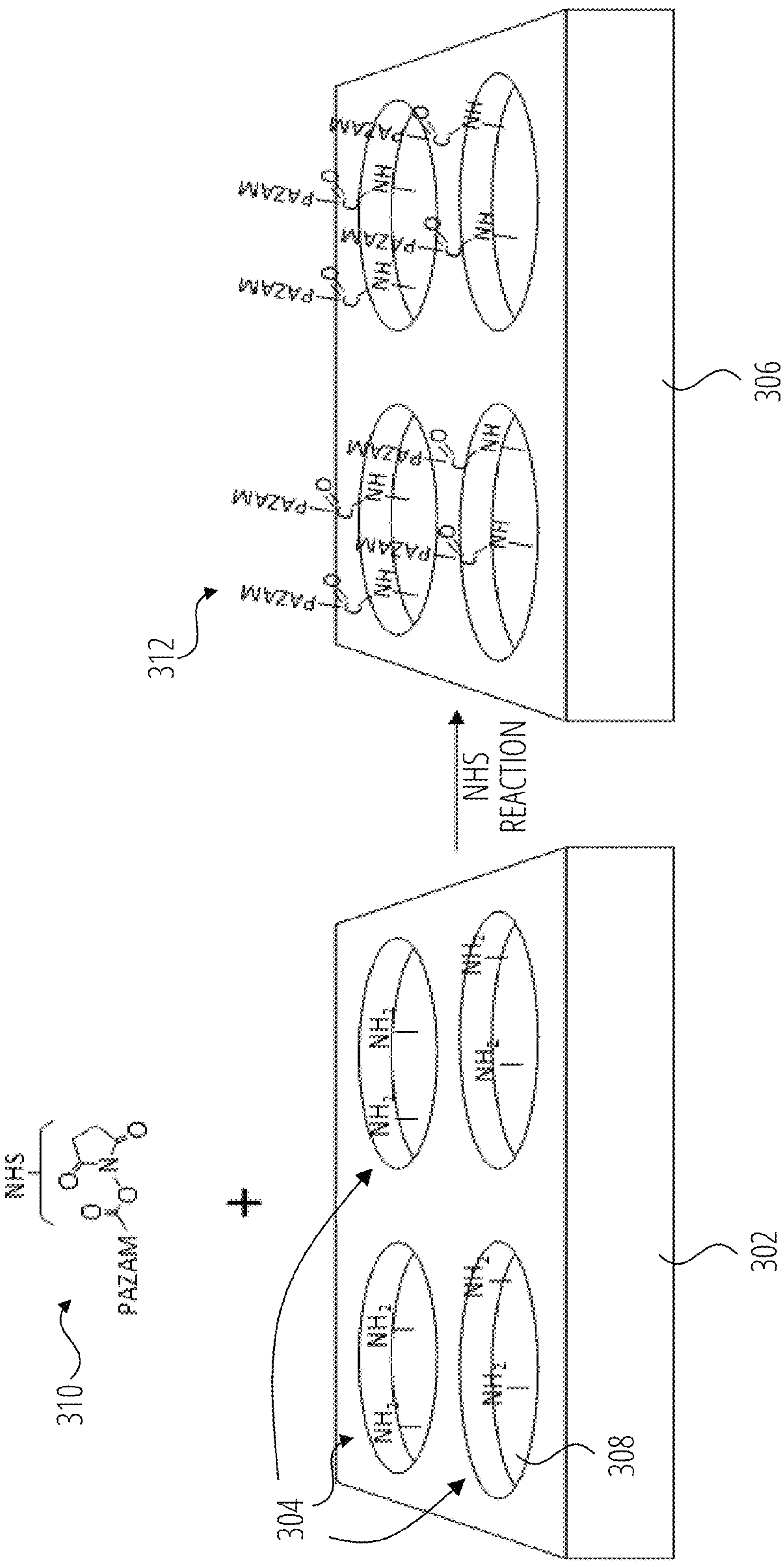
FIG. 3A illustrates a magnified schematic view of an example of functionalizing PAAm containing nanowells.

FIG. 3A illustrates the covalent attachment of NHS ester containing PAZAM-type hydrogel to the PAAm surface. Flow cell surface 302 includes depressions, such as nanowells 304. The bottom surface of nanowells 304 may include PAAm 308. The surface of PAAm 308 includes amino functional groups (—$NH_2$). These amino functional groups may react with NHS ester-functionalized hydrogel 310 to form PAAm-bound hydrogel 312. This reaction creates functionalized flow cell surface 306, which may be used for additional surface functionalization and grafting of the DNA oligos. Alternatively, the amino groups of the PAAm layer may first react with an NHS-norbornene bi-functional linker, then the norbornene moiety reacts with PAZAM to covalently attach PAZAM to surface.

As illustrated in FIG. 1A, DNA primers 116 may be bound to the functionalized layer 114. It may be desirable for the DNA primers 116 to be immobilized to the functionalized layer 114. In some examples, immobilization may be by single point covalent attachment to the functionalized layer 114 at the 5' end of the respective DNA primers 116.

Examples of terminated primers that may be used include an alkyne terminated primer, a tetrazine terminated primer, an azido terminated primer, an amino terminated primer, an epoxy or glycidyl terminated primer, a thiophosphate terminated primer, a thiol terminated primer, an aldehyde terminated primer, a hydrazine terminated primer, a phosphoramidite terminated primer, a triazolinedione terminated primer, and a biotin-terminated primer. In some specific examples, a succinimidyl (NHS) ester terminated primer may be reacted with an amine at a surface of the functionalized layer 114, an aldehyde terminated primer may be reacted with a hydrazine at a surface of the functionalized layer 114, or an alkyne terminated primer may be reacted with an azide at a surface of the functionalized layer 114, or an azide terminated primer may be reacted with an alkyne or DBCO (dibenzocyclooctyne) at a surface of the functionalized layer 114, or an amino terminated primer may be reacted with an activated carboxylate group or NHS ester at a surface of the functionalized layer 114, or a thiol terminated primer may be reacted with an alkylating reactant (e.g., iodoacetamine or maleimide) at a surface of the functionalized layer 114, a phosphoramidite terminated primer may be reacted with a thioether at a surface of the functionalized layer 114, or a biotin-modified primer may be reacted with streptavidin at a surface of the functionalized layer 114.

Any suitable covalent attachment means known in the art may be used, including the P5/P7 primers or P15/P17 primers described herein. In some examples, immobilization may be by noncovalent attachment.

Example Polish-Free Workflow 2

FIG. 1B illustrates another example of the polish-free workflow for creating a patterned flow cell surface. A first layer of PPMA 118 may be synthesized onto a base support 102. The base support 102 may include materials and arrangements discussed above. The method of synthesizing the first layer of PPMA 118 may be any suitable method. For example, suitable methods may include spin coating or CVD, including PECVD. PECVD may be desirable to synthesize a first layer of PAAm 106 because PECVD may allow for a high degree of cross-linking within the PPMA.

Over the first layer of PPMA 118, a second layer of PAAm 120 may be synthesized. It may be advantageous for the second layer of PAAm 120 to be thin, non-crosslinked and/or minimally crosslinked such that it can deform in response to contact with working stamp 104 in a subsequent step. When synthesizing the second layer of PAAm 120, it may be desirable to avoid methods involving solvents, as a solvent may dissolve the first layer of PPMA 118. For example, desirable methods may include spin coating or CVD, including iCVD. iCVD, a solventless method, may ensure that the first layer of PPMA 118 does not dissolve during synthesis of second layer of PAAm 120.

A working stamp 104 may press against the bilayer structure. The working stamp 104 may include any suitable material, for example PDMS or polyurethane. The dimensions and geometry of working stamp 104 may affect the final dimensions and geometry of the imprinted PAAm second layer 122. At certain combinations of temperature and pressure, such that the second layer of PAAm 120 may be deformed by contact with the working stamp 104 to form an imprinted PAAm second layer 122. As an example, the imprinted PAAm second layer 122 may deform at a temperature of 105° C. and a pressure of 0.1 bar. This example is used for illustrative purposes; other combinations of temperature and pressure may be used. Thickness of the second layer of PAAm 120 may affect whether a pattern in imprinted PAAm second layer 122 is formed without a residual PPMA layer over the first layer of PPMA 118. For example, a thickness of 50 nm of second layer of PAAm 120 may allow for pattern formation without a residual PAAm layer covering the first layer of PPMA 118. This example thickness is provided solely for illustrative purposes; other thicknesses may be used. The working stamp 104 may be pressed into the imprinted PAAm second layer 122 for a particular length of time. For example, at a temperature of 105° C. and a pressure of 0.1 bar, pressing for 30 minutes may be adequate to set the imprinted PAAm second layer 122. This duration is provided solely for illustrative purposes; other pressing durations may be used.

The working stamp 104 may be removed from imprinted PAAm second layer 122 and base support 102, first layer of PPMA 118 and imprinted PAAm second layer 122 may return to ambient temperature and pressure. The imprinted PAAm second layer 122 may retain aspects of the shape imposed on it by working stamp 104. Aspects of shape imposed onto imprinted PAAm second layer 122 by working stamp 104 may include a depression. The depression may include, for example, one or more nanowell 112. The dimensions of the nanowell 112 may be consistent with those already discussed herein. Nanowell 112 may include orthogonally functional nanodomains with amino and alkynyl functionality, for example, nanodomains including the exposed surfaces of imprinted PAAm second layer 122 and first layer of PPMA 118, respectively. In this example, the bottom of nanowell 112 includes a surface of the first layer of PPMA 118, and nanowells are separated by interstitials including the imprinted PAAm second layer 122. The depression imprinted into the imprinted PAAm second layer 122 is not restricted to just nanowells; it may include other features or patterns. Because the dimensions and the geometry of the top layer pattern may be dictated by the mold, stamp designs including nanowells, swaths, fiducials, and/or lanes may also be imprinted with this method.

Figure 3B:
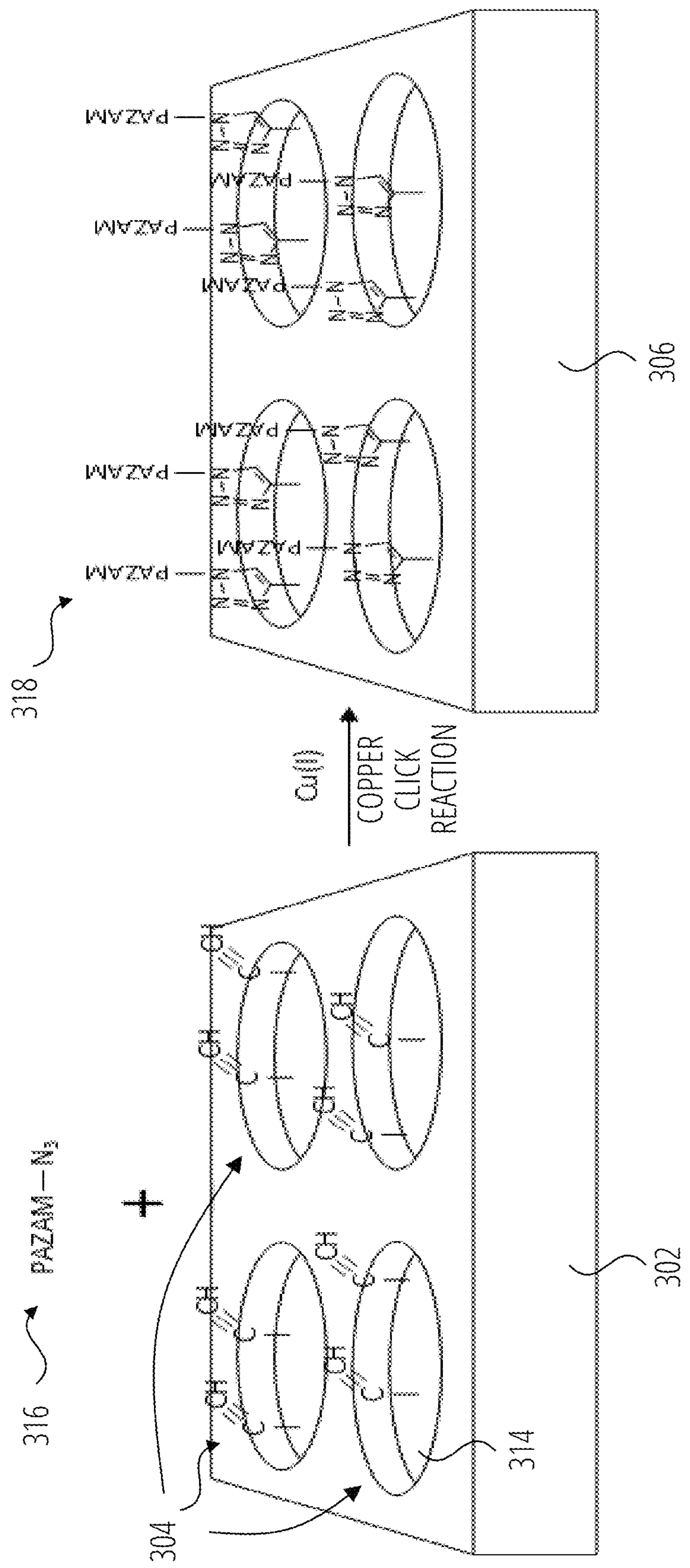
FIG. 3B illustrates a magnified schematic view of an example of functionalizing PPMA containing nanowells.

FIG. 3B illustrates the covalent attachment of azido containing hydrogel PAZAM to the PPMA surface. Flow cell surface 302 includes depressions, such as nanowells 304. The bottom surface of nanowells 304 may include PPMA 314. The surface of PPMA 314 includes alkynyl functional groups (—C≡CH). These alkynyl functional groups may react with PAZAM 316 via a Cu(I) click reaction to form PPMA-bound PAZAM 318. This reaction creates functionalized flow cell surface 306, which may be used for additional surface functionalization and grafting of the DNA oligos.

Substrates Prepared by the Polish-Free Method

Some aspect the present disclosure relates to a patterned substrate, comprising:

a base support;

a multi-layer stack positioned over the base support; the multi-layer stack comprising:

a first layer positioned over the base support;

a second layer positioned over the first layer, wherein the second layer comprises a plurality of depressions through the second layer and expose a surface of the first layer; and a functionalized hydrogel within at least a portion of the plurality of depressions, wherein the functionalized hydrogel is covalently attached to the first layer;

wherein the first layer of the multi-layer stack comprises a first polymer having a plurality of first functional groups selected from the group consisting of an amino, an alkynyl, a cycloalkenyl, a cycloalkynyl, a carboxyl, a vinyl, and a thiol; and wherein the second layer of the multi-layer stack comprises a second polymer having a plurality of second functional groups selected from the group consisting of an amino, an alkynyl, a cycloalkenyl, a cycloalkynyl, a carboxyl, a vinyl, and a thiol, and the second functional groups are orthogonal to the first functional groups.

In some embodiments of the patterned substrate described herein, each of the first and the second polymer may have functional groups selected from the group consisting of an amino and an alkynyl. In further embodiments, the first layer of the multi-layer stack comprises amino groups (e.g., PAAm), and the second layer the second layer of the multi-layer stack comprises alkynyl groups (e.g., PPMA). In some such embodiments, the functionalized hydrogel comprises NHS ester groups that form amide bonds with the amino groups of the first polymer (e.g., PAAm) in the first layer.

In some other embodiments of the patterned substrate described herein, the first layer of the multi-layer stack comprises alkynyl groups (e.g., PPMA), and the second layer the second layer of the multi-layer stack comprises amino groups (e.g., PAAm). In some such embodiments, the functionalized hydrogel comprises azido groups that form triazoline bonds with the alkynyl groups of the polymer (e.g., PPMA) in the first layer. In some further embodiments, the functionalized hydrogel comprises polyacrylamide or modified derivatives thereof. In some such embodiments, the azido containing functionalized hydrogel comprises PAZAM.

In some embodiments of the patterned substrate described herein, the depressions comprise swaths, fiducials, lanes, or wells, or combination thereof. In further embodiments, the depressions comprise wells. In further embodiments, the well may comprise a volume between about $1\times10^{-3}$ $\mu m^3$ and $1\times10^4$ $\mu m^3$. In further embodiments, the well may comprise a depth between about 0.1 μm and $1\times10^3$ μm. In further embodiments, the well may comprise an opening comprising a surface area between about $1\times10^{-3}$ $\mu m^2$ and $1\times10^3$ $\mu m^2$. In some embodiments, the patterned substrate may comprise at least 1,000,000, 2,000,000, 3,000,000, 4,000,000, or 5,000,000 spatially distinguishable depressions.

In further embodiments of the patterned substrate, the substrate may further comprise oligonucleotides or polynucleotides (e.g., DNA oligos or DNA primers) grafted on the functionalized hydrogel. For example, the DNA oligos may be covalently attached to the functionalized hydrogel described herein, for example, the 5' end of the oligos are covalently bounded to the functionalized hydrogel. In further embodiments, the DNA oligos may comprise P5/P7 primers or P15/P17 primers described herein.

In any embodiments of the patterned substrate described herein, when the first or the second layer comprises a plurality of carboxyl groups, the carboxyl groups may be in an activated form such as an active ester such that the activated carboxyl groups react with amino groups to form amide bonds.

In any embodiments of the patterned substrate described herein, the substrate comprises or is a flow cell.

Methods for Manufacturing SPEAR Substrates

In another aspect, the present disclosure provides a method for creating a substrate supporting simultaneous paired-end reads (SPEAR). Previously, the method for creating spatial separation between read 1 and read 2 pads included several steps. For example, a typical process involved multiple nanopatterning steps including the addition and removal of several layers of materials, some of which act as temporary sacrificial masks. See, for example, the processes described in U.S. Publication No. 2021/0190675, which is incorporated by reference in its entirety. The present disclosure provides a simplified patterning process for creating a SPEAR substrate. In particular, two different types of functionalized hydrogels may be attached to orthogonally functionalized nanodomains in a one-pot fashion. Such one-pot process may be desirable to shorten and simplify the substrate fabrication process. The process may comprise:

contacting a stamp comprising a plurality of multi-level microscale or nanoscale patterns with a multi-layer stack positioned over a base support of a substrate, wherein the multi-layer stack comprises a first layer positioned over the base support, a second layer positioned over the first layer, and a third layer positioned over the second layer;

imprinting the third layer to create a plurality of multi-level depressions each comprising a deep portion and a shallow portion defined by a step portion;

etching the third layer to transfer the plurality of the multi-level depressions from the third layer to the second layer and the first layer, wherein the deep portion of the depressions are transferred to the first layer and exposes a surface of the first layer, wherein the shallow portion of the depressions are transferred to the second layer and expose a surface of the second layer; and contacting the exposed surface of the first layer and the exposed surface of the second layer with a polymer composition comprising a first functionalized hydrogel and a second functionalized hydrogel to covalently attach the first functionalized hydrogel to the exposed surface of the first layer, and to covalently attach the second functionalized hydrogel to the exposed surface of the second layer;

wherein the first layer of the multi-layer stack comprises a first polymer having a plurality of first functional groups selected from the group consisting of an amino, an alkynyl, a cycloalkenyl, a cycloalkynyl, a carboxyl, a vinyl, and a thiol, wherein the second layer of the multi-layer stack comprises a second polymer having a plurality of second functional groups selected from the group consisting of an amino, an alkynyl, a cycloalkenyl, a cycloalkynyl, a carboxyl, a vinyl, and a thiol, and the second functional groups are orthogonal to the first functional groups; and wherein the third layer does not comprise either the first or the second functional groups, and wherein the third layer is inert to both the first functionalized hydrogel and the second functionalized hydrogel.

In some embodiments of the method described herein, each of the first and the second polymer may have functional groups selected from the group consisting of an amino and an alkynyl. In further embodiments, the first layer of the multi-layer stack comprises amino groups (e.g., PAAm), and the second layer the second layer of the multi-layer stack comprises alkynyl groups (e.g., PPMA). In some such embodiments, the functionalized hydrogel comprises NHS ester groups that form amide bonds with the amino groups of the polymer (e.g., PAAm) in the first layer.

In some other embodiments of the method described herein, the first layer of the multi-layer stack comprises alkynyl groups (e.g., PPMA), and the second layer the second layer of the multi-layer stack comprises amino groups (e.g., PAAm). In some such embodiments, the functionalized hydrogel comprises azido groups that form triazoline bonds with the alkynyl groups (also known as acetylene) of the polymer (e.g., PPMA) in the first layer. In some further embodiments, the functionalized hydrogel comprises polyacrylamide or modified derivatives thereof. In some such embodiments, the azido containing functionalized hydrogel comprises PAZAM.

Though PAAm and PPMA are described as components of the bottom and/or top layer in the example workflows below, different materials or combinations of materials may be used in creating the first and second layer. Disclosed herein are several combinations of materials having orthogonal chemistries which may be included in a polish-free substrate. For example, the alkynyl group may be contained in a cycloalkynyl (e.g., dibenzocyclooctyl DBCO or bicyclononyne BCN) to facilitate a strain-promoted 1,3-dipolar cycloaddition reaction (SPAAC). In addition, cycloalkene such as norbornene may also be used in the SPAAC reaction with azido containing material. Non-limiting examples also include the combination of thiol-ene coupling/copper free SPAAC reaction; EDC/NHS activated carboxyl and amino coupling/thiol-ene coupling; copper free SPAAC/thiol-ene coupling; and terminal alkene hydroboration/internal alkene thiol-ene coupling.

In some embodiments of the method described herein, wherein the multi-layer stack is prepared by: depositing the first polymer on the base support of the substrate to form the first layer; depositing the second polymer over the first layer to form the second layer; and depositing the third polymer over the second layer to form the third layer. In some instances, the depositing of the first or second polymer is by chemical vapor deposition (CVD) or spin coating.

In some embodiments of the method described herein, wherein the depressions comprise swaths, fiducials, lanes, or wells, or combination thereof. In further embodiments, the depressions comprise wells. In further embodiments, the well may comprise a volume between about $1\times10^{-3}$ μm$^3$ and $1\times10^{4}$ μm$^3$. In further embodiments, the well may comprise a depth between about 0.1 μm and $1\times10^{3}$ μm. In further embodiments, the well may comprise an opening comprising a surface area between about $1\times10^{-3}$ μm$^2$ and $1\times10^{3}$ μm$^2$. In some embodiments, the patterned substrate may comprise at least 1,000,000, 2,000,000, 3,000,000, 4,000,000, or 5,000,000 spatially distinguishable depressions.

In further embodiments of the method, the method may further comprise grafting oligonucleotides or polynucleotides (e.g., DNA oligos) to the functionalized hydrogel.

In any embodiments of the method described herein, when the first or the second layer comprises a plurality of carboxyl groups, the carboxyl groups may be in an activated form such as an active ester such that the activated carboxyl groups react with amino groups to form amide bonds.

In any embodiments of the method described herein, the third payer comprises a non-reactive resin.

In some embodiments of the process described herein, wherein etching comprises dry etching. In further embodiments, the process may be a solventless process. A solventless workflow may be desirable because certain nanopatterning materials may be incompatible with particular solvents. For example, a solvent used to remove a sacrificial material may also degrade a common layering material.

The method described herein coat a multilayer structure with different chemistries may be used to make a multifunctional substrate with spatially separated read 1 and read 2 pads to support SPEAR sequencing. Read 1 and read 2 pads may be included within a single depression, such as a nanowell. The disclosed method may spatially separate read 1 and read 2 pads by layering materials that have orthogonal chemistries. In the example substrates and example methods disclosed, the bottom and middle layers may have orthogonal chemistries. This may be achieved, for example, with a layer of PAAm and a layer PPMA. Though PAAm and PPMA are described as components of the reactive layers in the examples below, different materials or combinations of materials may be used in creating the reactive layers. A few example methods of creating SPEAR-suitable substrates are described in detail below.

Example SPEAR Substrate Workflow 1

Figure 2A:
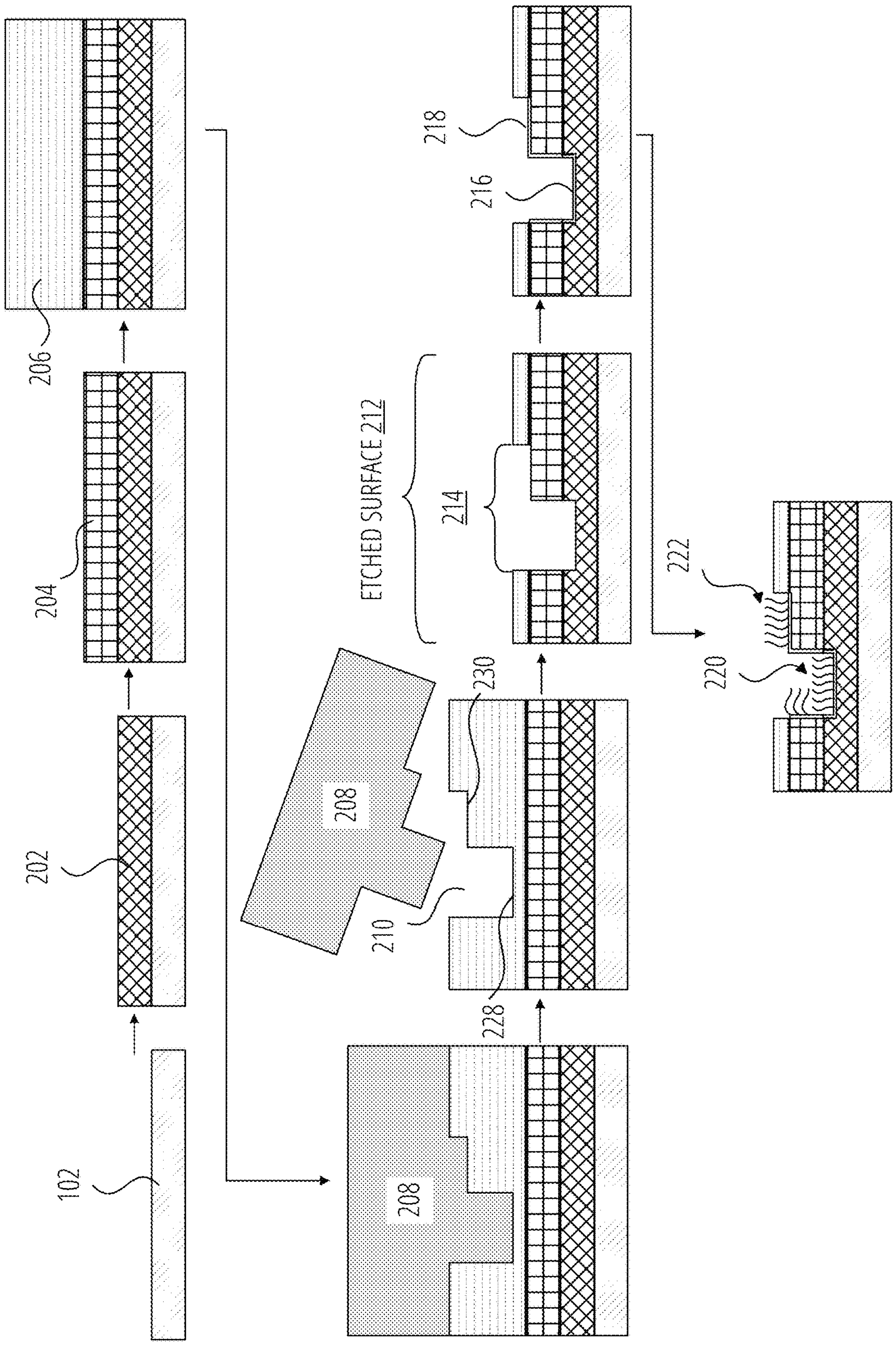
FIG. 2A schematically illustrates a first example of a workflow to prepare a patterned SPEAR substrate according to an embodiment of the present disclosure.

FIG. 2A illustrates an exemplary workflow for creating a SPEAR substrate (e.g., flow cell) surface. A first reactive layer of PAAm 202 may be synthesized onto a base support 102. The base support 102 may include materials and arrangements disclosed herein as part of the polish-free substrate workflow. The method of synthesizing the first reactive layer of PAAm 202 may be any suitable method. For example, suitable methods may include spin coating or CVD, including plasma-enhanced chemical vapor deposition (PECVD). Whatever the method of synthesis, it may be desirable that the method allows for a high degree of cross-linking within the PAAm, such that the layer provides a robust base for second reactive layer of PPMA 204 and non-reactive third layer 206.

Over the first reactive layer of PAAm 202, a second reactive layer of PPMA 204 may be synthesized. When synthesizing the second layer of PPMA 204, it may be desirable to avoid methods involving solvents, as a solvent may dissolve the first reactive layer of PAAm 202. For example, desirable methods may include spin coating or CVD, for example PECVD. Whatever the method of synthesis, it may be desirable that the method allows for a high degree of cross-linking within the PPMA, such that the layer provides a robust base for non-reactive third layer 206.

Over the second reactive layer of PPMA 204, a non-reactive layer 206 may be synthesized. When synthesizing the non-reactive layer 206, it may be desirable to avoid methods involving solvents, as a solvent may dissolve the second reactive layer of PPMA 204. For example, desirable methods may include spin coating or CVD, for example iCVD. Whatever the method of synthesis, it may be desirable that the method results in minimal or no crosslinking within the non-reactive layer 206. Minimal or no crosslinking in non-reactive layer 206 may be desirable so the non-reactive layer 206 can deform in response to contact with working stamp 208 in a subsequent step.

It may be desirable for the non-reactive layer 206 to include a material that is inert to the functional compounds introduced later in the workflow. For instance, the non-reactive layer 206 may not include functional groups to create covalent bonds with either the first functionalized layer 216 or second functionalized layer 218. The non-reactive layer 206 may be a resin, for example. In the example diagrammed in FIG. 2A, the non-reactive layer does not include an alkynyl or amino functional group, and is thus nonreactive to the downstream functionalization reactions, for example NHS activated carboxylic acid reaction with amino, and Cu(I) click reaction.

The non-reactive layer 206 may be deposited over the second reactive layer of PPMA 204 using any suitable deposition technique, including the examples disclosed herein. In embodiments where non-reactive layer 206 is a resin, non-reactive layer 206 may be cured using conditions suitable for the resin. Some examples of suitable resins are selected from the group consisting of a polyhedral oligomeric silsesquioxane (POSS)-based resin, an epoxy resin, a poly(ethylene glycol) resin, a polyether resin, an acrylic resin, an acrylate resin, a methacrylate resin, and combinations thereof. While several examples have been provided, it is believed that any resin that can be cured may be used.

As used herein, the term "polyhedral oligomeric silsesquioxane" (commercially available as POSS® from Hybrid Plastics) refers to a chemical composition that is a hybrid intermediate (e.g., $RSiO_{1.5}$) between that of silica ($SiO_2$) and silicone ($R_2SiO$). An example of polyhedral oligomeric silsesquioxane can be that described in Kehagias et al., Microelectronic Engineering 86 (2009), pp. 776-778, which is incorporated by reference in its entirety. In an example, the composition is an organosilicon compound with the chemical formula $[RSiO_{3/2}]_n$, where the R groups can be the same or different. Example R groups for polyhedral oligomeric silsesquioxane include epoxy, azide/azido, a thiol, a poly(ethylene glycol), a norbornene, a tetrazine, acrylates, and/or methacrylates, or further, for example, alkyl, aryl, alkoxy, and/or haloalkyl groups. The resin composition disclosed herein may comprise one or more different cage or core structures as monomeric units. Resins are discussed further in U.S. Publication No. 2021/0190675, which is incorporated herein by reference.

A working stamp 208 may contact the non-reactive layer 206, pressing to form a multi-layer indentation 210, having a deep portion and a shallow portion defined by a step portion. Working stamp 208 may contact non-reactive layer 206 at a temperature and pressure such that non-reactive layer 206 may deform but first reactive layer of PAAm 202 and second reactive layer of PPMA 204 may not deform and/or remain substantially undeformed. Working stamp 208 may press into non-reactive layer 206 for a duration sufficient to set an indentation 210. After the press duration, the base support 102, first reactive layer of PAAm 202, second reactive layer of PPMA 204, and non-reactive layer 206 may return to ambient temperature and pressure.

The dimensions and geometry of working stamp 208 may affect the dimensions and geometry of the indentation 210. Indentation 210 may include a lower surface 228 and an upper surface 230. The difference in depth between the lower surface 228 and the upper surface 230 may relate to the difference in thickness between the top surface of second reactive layer of PPMA 204 and the top surface of first reactive layer of PAAm 202. For example, the difference in depth between the lower surface 228 and upper surface 230 may be approximately equal to the thickness of the second reactive layer of PPMA 204.

Subsequently, the multilayer structure may be etched to create etched surface 212. Etching may include dry etching, for example. Etching may remove material from the non-reactive layer 206, the second reactive layer of PPMA 204, and the first reactive layer of PAAm 202 to expose surfaces within the first reactive layer of PAAm 202 and second reactive layer of PPMA 204. Etching may therefore transfer the indentation 210 to the first reactive layer 202 and the second reactive layer 204 to form depression 214.

In certain embodiments, the volume of the depression 214 is between approximately $1\times10^{-3}$ μm$^3$ and $1\times10^{4}$ μm$^3$, between approximately $1\times10^{-2}$ μm$^3$ and $1\times10^{3}$ μm$^3$, between approximately $1\times10^{-1}$ μm$^3$ and $1\times10^{2}$ μm$^3$, between approximately 1 μm$^3$ and 10 μm$^3$, or any value or range within or bounded by any of these ranges or values, although values outside these values or ranges can be used in some cases. In certain embodiments, the depth of the nanowell 112 ranges between approximately 0.1 μm and $1\times10^{3}$ μm, approximately 1 μm and $1\times10^{2}$ μm, approximately 5 μm and 50 μm, or any value or range within or bounded by any of these ranges or values, although values outside these values or ranges can be used in some cases. In certain embodiments, the opening of nanowell 112 includes a surface area between approximately $1\times10^{-3}$ μm$^2$ and $1\times10^{3}$ μm$^2$, $1\times10^{-2}$ μm$^2$ and $1\times10^{2}$ μm$^2$, 0.1 μm$^2$ and 10 μm$^2$, 1 μm$^2$ and 5 μm$^2$, or any value or range within or bounded by any of these ranges or values, although values outside these values or ranges can be used in some cases.

Etched surface 212 may undergo selective functionalization. The exposed surface of the first reactive layer of PAAm 202 may react to form a first functionalized layer 216. The exposed surface of the second reactive layer of PPMA 204 may react to form a second functionalized layer 218. In certain embodiments, the first reactive layer of PAAm 202 reacts with NHS ester-functionalized hydrogel to create a first functionalized layer 216 including the NHS ester-functionalized hydrogel. The first functionalized layer 216 may cover the exposed surface of the first reactive layer of PAAm 202. Alternatively, the PAAm layer may first react with an NHS ester-norbornene bi-functional linker, then the norbornene moiety of the link may react with azido containing hydrogel to form the first functionalized layer 216. Additionally, in this example, the second reactive layer of PPMA 204 may react via a Cu(I) click reaction to form a second functionalized layer 218 including azido-functionalized hydrogel. Second functionalized layer 218 may cover the exposed surface of the second reactive layer of PPMA 204. Though azido-functionalized hydrogel and NHS ester-functionalized hydrogel are identified in this example, other functional layer types may be used depending on the functional groups present in the first reactive layer and the second reactive layer. For the functionalized layers, it may be desirable to select two materials that are compatible with the first and second reactive layers. The reaction to form the first functionalized layer 216 may be carried out simultaneously (i.e., in a one-pot synthesis) with the reaction to form the second functionalized layer 218. It may be desirable to do so in order to save time and/or reagents. However, the reactions need not be simultaneous. The reactions may be carried out in series, for example.

Furthermore, the first DNA primer 220 and the second DNA primer 222 may be attached to the first functionalized layer 216 and the second functionalized layer 218, respectively. It may be desirable for the DNA primers 220 and 222 to be immobilized to the functionalized layers 216 and 218. In some examples, immobilization may be by single point covalent attachment to the functionalized layers 216 and 218 at the 5' end of the respective DNA primers 220 and 222. Any suitable covalent attachment means known in the art may be used. In some examples, immobilization may be by strong noncovalent attachment.

Examples of terminated primers that may be used include an alkyne terminated primer, a tetrazine terminated primer, an azido terminated primer, an amino terminated primer, an epoxy or glycidyl terminated primer, a thiophosphate terminated primer, a thiol terminated primer, an aldehyde terminated primer, a hydrazine terminated primer, a phosphoramidite terminated primer, a triazolinedione terminated primer, and a biotin-terminated primer. In some specific examples, a succinimidyl (NHS) ester terminated primer may be reacted with an amine at a surface of the functionalized layers 216 and/or 218, an aldehyde terminated primer may be reacted with a hydrazine at a surface of the functionalized layers 216 and/or 218, or an alkyne terminated primer may be reacted with an azide at a surface of the functionalized layers 216 and/or 218, or an azide terminated primer may be reacted with an alkyne or DBCO at a surface of the functionalized layers 216 and/or 218, or an amino terminated primer may be reacted with an activated carboxylate group or NHS ester at a surface of the functionalized layers 216 and/or 218, or a thiol terminated primer may be reacted with an alkylating reactant (e.g., iodoacetamine or maleimide) at a surface of the functionalized layer 114, a phosphoramidite terminated primer may be reacted with a thioether at a surface of the functionalized layers 216 and/or 218, or a biotin-modified primer may be reacted with streptavidin at a surface of the functionalized layers 216 and/or 218. The functionalized layers 216 and/or 218 may be a functionalized hydrogel layer described herein.

The DNA primers 216 and 218 may include a universal sequence for capture and/or amplification purposes. Examples of the DNA primers 216 and/or 218 include P5/P7 primers or P15/P17 primers as described herein.

For sequential paired end sequencing, the DNA primers 216 and 218 may also include a cleavage site. The cleavage sites of the DNA primers 216, 218 may be different from each other so that cleavage of the DNA primers 216, 218 does not take place at the same time. Examples of suitable cleavage sites include enzymatically cleavable nucleobases or chemically cleavable nucleobases, modified nucleobases, or linkers (e.g., between nucleobases). The enzymatically cleavable nucleobase may be susceptible to cleavage by reaction with a glycosylase and an endonuclease, or with an exonuclease. One specific example of the cleavable nucleobase is deoxyuracil (dU), which can be targeted by the USER enzyme. In an example, the uracil base may be incorporated at the $7^{th}$ base position from the 3' end of the P5 primer (P5U) or of the P7 primer (P7U). Other abasic sites may also be used. Examples of the chemically cleavable nucleobases, modified nucleobases, or linkers include 8-oxoguanine, a vicinal diol, a disulfide, a silane, an azobenzene, a photocleavable group, allyl T (a thymine nucleotide analog having an allyl functionality), allyl ethers, or an azido functional ether.

In one example, first functionalized layer 216 may have a surface functional group that can immobilize the terminal group at the 5' end of the first DNA primer 220. Similarly, second functionalized layers 218 may have a surface functional group that can immobilize the terminal group at the 5' end of the first DNA primer 220. In one example, the immobilization chemistry between the first functionalized layer 216 and the first DNA primer 220 and the immobilization chemistry between the second functionalized layer 218 and the second DNA primer 222 may be different so that the primers first DNA primer 220 or second DNA primer 222 selectively attach to the desirable layer 216 or 218. In another example, the immobilization chemistry may be the same for the layers 216 or 218 and the respective primers 220 or 222. In this example, immobilization may be by single point covalent attachment to the respective functionalized layers 216 or 218 at the 5' end of the respective primers 220 or 222. Any suitable covalent attachment means known in the art may be used.

In another example, primers 220 or 222 are attached to the functionalized layers 216 or 218, for example, through linkers. The first functionalized layer 216 may have surface functional groups that can immobilize a first linker at the 5' end of the first DNA primer 220. Similarly, the second functionalized layer 218 may have surface functional groups that can immobilize a second linker at the 5' end of the second DNA primer 222. In one example, the immobilization chemistry for the first functionalized layer 216 and the first linker and the immobilization chemistry for the second functionalized layer 218 and a second linker may be different so that the primers 220 or 222 selectively graft to the desirable functionalized layer 216 or 218. In another example, the immobilization chemistry may be the same for the functionalized layers 216, 218 and the first and second linkers and any suitable technique disclosed herein may be used to graft one primer 220, 222 at a time.

In an example, read 1 and read 2 pads may include attached primers 220 and 222, respectively. In an alternative example, read 1 pad may include attached second DNA primer 222 and read 2 pad may include attached first DNA primer 220. In yet another example, read 1 pad includes both attached primers 220 and 222. In another example, read 2 pad includes both attached primers 220 and 222.

Example SPEAR Substrate Workflow 2

Figure 2B:
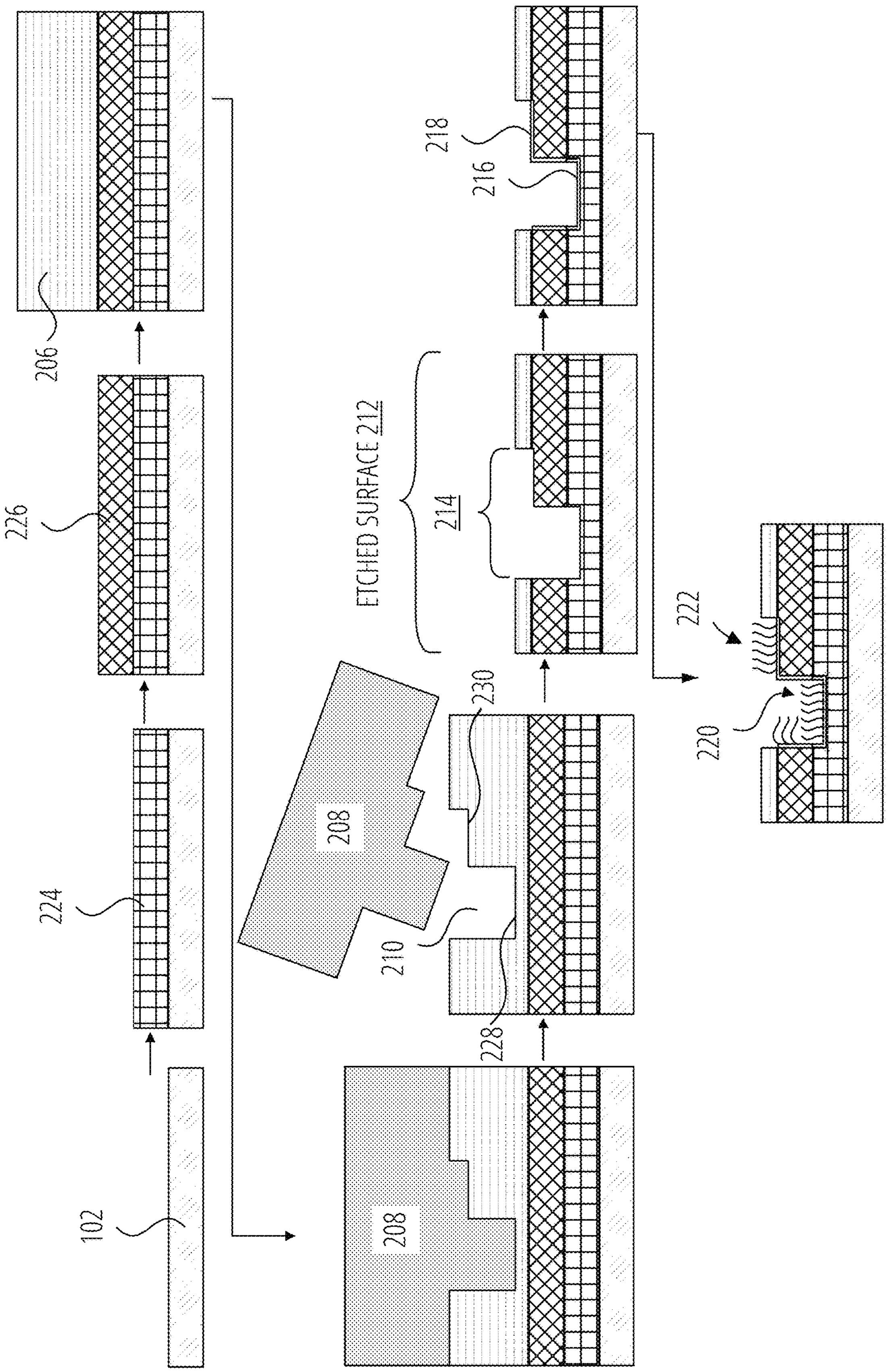
FIG. 2B schematically illustrates a second example of a workflow to prepare a patterned SPEAR substrate according to an embodiment of the present disclosure.

FIG. 2B illustrates an exemplary workflow for creating a SPEAR substrate (e.g., flow cell) surface. A first reactive layer of PPMA 224 may be synthesized onto a base support 102. The base support 102 may be glass, for example. The method of synthesizing the first reactive layer of PPMA 224 may be any suitable method. For example, suitable methods may include spin coating or CVD, including plasma-enhanced chemical vapor deposition (PECVD). Whatever the method of synthesis, it may be desirable to that the method allows for a high degree of cross-linking within the PAAm, such that the layer provides a robust base for second reactive layer of PAAm 226 and non-reactive layer 206.

Over the first reactive layer of PPMA 224, a second reactive layer of PAAm 226 may be synthesized. When synthesizing the second reactive layer of PAAm 226, it may be desirable to avoid methods involving solvents, as a solvent may dissolve the first reactive layer of PPMA 224. For example, desirable methods may include spin coating or CVD, for example PECVD. Whatever the method of synthesis, it may be desirable to that the method allows for a high degree of cross-linking within the PPMA, such that the layer provides a robust base for non-reactive layer 206.

Over the second reactive layer of PAAm 226, a non-reactive layer 206 may be synthesized. When synthesizing the non-reactive layer 206, it may be desirable to avoid methods involving solvents, as a solvent may dissolve the second reactive layer of PAAm 226. For example, desirable methods may include spin coating or CVD, for example iCVD. Whatever the method of synthesis, it may be desirable that the method results in minimal or no crosslinking within the non-reactive layer 206. Minimal or no crosslinking in non-reactive layer 206 may be desirable so the non-reactive layer 206 can deform in response to contact with working stamp 208 in a subsequent step.

It may be desirable for the non-reactive layer 206 to include a material that is inert to the functional compounds introduced later in the workflow. For instance, the non-reactive layer 206 may not include functional groups to create covalent bonds with either the first functionalized layer 216 or the second functionalized layer 218. Non-reactive layer 206 may be a resin, for example. In the example diagrammed in FIG. 2A, the non-reactive layer does not include an alkynyl or amino functional group, and is thus nonreactive to the downstream functionalization reactions, for example NHS activated carboxylic acid reaction with amino groups, and Cu(I) click reactions. A suitable resin may be chosen for the non-reactive layer 206 and layered upon the second reactive layer of PAAm 226 in accordance with the present disclosure.

A working stamp 208 may contact the non-reactive layer 206, pressing to form a multi-layer indentation 210. Working stamp 208 may contact non-reactive layer 206 at a temperature and pressure such that the non-reactive layer 206 may deform but the first reactive layer of PPMA 224 and the second reactive layer of PAAm 226 may not deform and/or remain substantially undeformed. Working stamp 208 may press into the non-reactive layer 206 for a duration sufficient to set an indentation 210. Subsequent, the base support 102, the first reactive layer of PPMA 224, the second reactive layer of PAAm 226, and the non-reactive layer 206 may return to ambient temperature and pressure.

The dimensions and geometry of the working stamp 208 may affect the dimensions and geometry of the indentation 210. The indentation 210 may include a lower surface 228 and an upper surface 230. The difference in depth between the lower surface 228 and the upper surface 230 may relate to the difference in thickness between the top surface of the second reactive layer of PAAm 226 and the top surface of the first reactive layer of PPMA 224. For example, the difference in depth between the lower surface 228 and the upper surface 230 may be approximately equal to the thickness of the second reactive layer of PAAm 226.

Subsequently, the multilayer structure may be etched to create etched surface 212. Etching may include dry etching, for example. Etching may remove material from the non-reactive layer 206, the second reactive layer of PAAm 226, and the first reactive layer of PPMA 224 to expose surfaces within the first reactive layer of PPMA 224 and second reactive layer of PAAm 226. Etching may therefore transfer the indentation 210 to the first reactive layer 224 and second reactive layer 226 to form depression 214, for example. These surfaces may be included within depression 214, for example. In certain embodiments, the dimensions of the depression 214 are consistent with those disclosed herein.

Etched surface 212 may undergo selective functionalization. The exposed surface of the first reactive layer of PPMA 224 may react to form a first functionalized layer 216. The exposed surface of the second reactive layer of PAAm 226 may react to form a second functionalized layer 218. In an example, the first reactive layer of PPMA 224 may react with via a Cu(I) click reaction to form a first functionalized layer 216 including a Cu(I) click-functionalized hydrogel. The first functionalized layer 216 may cover the exposed surface of the first reactive layer of PPMA 224. In an example, the second reactive layer of PAAm 226 reacts with an NHS ester-functionalized hydrogel to create a second functionalized layer 218. The second functionalized layer

218 may cover the exposed surface of the second reactive layer of PAAm 226. Alternatively, the second reactive layer of PAAm 226 may react with an NHS-norbornene bifunctional linker that links the second reactive layer of PAAm 226 to an azido functionalized hydrogel to form the second functionalized layer 218. Though two different functional hydrogels are identified in this example, other materials may be used. For the functionalized layers, it may be desirable to select two materials that are compatible with the first and second reactive layers. The reaction to form the first functionalized layer 216 may be carried out simultaneously (i.e., in a one-pot synthesis) with the reaction to form the second functionalized layer 218. It may be desirable to do so in order to save time and/or reagents. However, the reactions need not be simultaneous. The reactions may be carried out in series, for example.

A first DNA primer 220 and a second DNA primer 222 may be attached to first functionalized layer 216 and second functionalized layer 218, respectively. Attachment of primers may be done in accordance with Example SPEAR workflow 1, described herein. Also, primers may correspond to various read pads in accordance with Example SPEAR workflow 1, described herein.

SPEAR Substrates Prepared by the Method

Some aspect the present disclosure relates to a patterned substrate, comprising:

- a base support;
- a multi-layer stack positioned over the base support; the multi-layer stack comprising:
- a first layer positioned over the base support;
- a second layer positioned over the first layer, wherein the second layer comprises a first plurality of depressions through the second layer which expose a surface of the first layer; and
- a third layer positioned over the second layer, wherein the third layer comprises a second plurality of depressions through the third layer which expose a surface of the second layer, wherein the second plurality of depressions are spatially separated from the first plurality of depressions;
- a first functionalized hydrogel within at least a portion of the first plurality of depressions, wherein the first functionalized hydrogel is covalently attached to the first layer; and
- a second functionalized hydrogel within at least a portion of the second plurality of depressions, wherein the second functionalized hydrogel is covalently attached to the second layer;
- wherein the first layer of the multi-layer stack comprises a first polymer having a plurality of first functional groups selected from the group consisting of an amino, an alkynyl, a cycloalkenyl, a cycloalkynyl, a carboxyl, a vinyl, and a thiol;
- wherein the second layer of the multi-layer stack comprises a second polymer having a plurality of second functional groups selected from the group consisting of an amino, an alkynyl, a cycloalkenyl, a cycloalkynyl, a carboxyl, a vinyl, and a thiol, and the second functional groups are orthogonal to the first functional groups; and
- wherein the third layer does not comprise either the first or the second functional groups, and wherein the third layer is inert to both the first functionalized hydrogel and the second functionalized hydrogel.

In some embodiments of the SPEAR substrate described herein, the first functionalized hydrogel comprises a first polyacrylamide copolymer having functional groups that form covalent bonding with the plurality of first functional groups. In further embodiments, the second functionalized hydrogel comprises a second polyacrylamide copolymer having functional groups that form covalent bonding with the plurality of second functional groups.

In some embodiments of the SPEAR substrate described herein, each of the first and the second polymer may have functional groups selected from the group consisting of an amino and an alkynyl. In further embodiments, the first layer of the multi-layer stack comprises amino groups (e.g., PAAm), and the second layer the second layer of the multi-layer stack comprises alkynyl groups (e.g., PPMA). In some such embodiments, the first functionalized hydrogel comprises NHS ester groups that form amide bonds with the amino groups of the first polymer (e.g., PAAm) in the first layer. In further embodiments, the second functionalized hydrogel comprises azido groups (e.g., PAZAM) that form triazoline bonds with the alkynyl groups of the second polymer (e.g., PPMA) in the second layer.

In some other embodiments of the SPEAR substrate described herein, the first layer of the multi-layer stack comprises alkynyl groups (e.g., PPMA), and the second layer the second layer of the multi-layer stack comprises amino groups (e.g., PAAm). In some such embodiments, the first functionalized hydrogel comprises azido groups (e.g., PAZAM) that form triazoline bonds with the alkynyl groups of the first polymer (e.g., PPMA) in the first layer. In some further embodiments, the second functionalized hydrogel comprises NHS ester groups that forms amide bonds with the amino groups of the second polymer (e.g., PAAm) in the second layer.

In some embodiments of the SPEAR substrate described herein, the depressions comprise swaths, fiducials, lanes, or wells, or combination thereof. In further embodiments, the depressions comprise wells. In further embodiments, the well may comprise a volume between about $1\times10^{-3}$ $\mu m^3$ and $1\times10^4$ $\mu m^3$. In further embodiments, the well may comprise a depth between about 0.1 $\mu m$ and $1\times10^3$ $\mu m$. In further embodiments, the well may comprise an opening comprising a surface area between about $1\times10^{-3}$ $\mu m^2$ and $1\times10^3$ $\mu m^2$. In some embodiments, the patterned substrate may comprise at least 1,000,000, 2,000,000, 3,000,000, 4,000,000, or 5,000,000 spatially distinguishable depressions.

In further embodiments of the SPEAR substrate described herein, the substrate may further comprise oligonucleotides or polynucleotides (e.g., DNA oligos or DNA primers) grafted on the first and/or second functionalized hydrogels. For example, the DNA oligos may be covalently attached to the functionalized hydrogel described herein, for example, the 5' end of the oligos are covalently bounded to the functionalized hydrogel.

In any embodiments of the SPEAR substrate described herein, when the first or the second layer comprises a plurality of carboxyl groups, the carboxyl groups may be in an activated form such as an active ester such that the activated carboxyl groups react with amino groups to form amide bonds.

In any embodiments of the SPEAR substrate described herein, the substrate comprises or is a flow cell.

In some embodiments of the SPEAR substrate and process described herein, the first plurality of depressions define or comprise a first region on the substrate, and the second plurality of depressions define or comprise a second region on the substrate, wherein the first region is spatially separate from the second region, or overlapping with the second region. In further embodiments, the first plurality of depressions have different depth than the second plurality of depressions. In further embodiments, the first region of the substrate comprises a first primer set attached thereto the first functionalized hydrogel, where the first primer set including an un-cleavable first primer and a cleavable second primer. In further embodiments, the second region of the substrate comprises a second primer set attached thereto the second functionalized hydrogel, where the second primer set including a cleavable first primer and an un-cleavable second primer. In further embodiments, at least one cleavable first or second primer is a P5, P7, P15 or P17 primer described herein.

Alternative Orthogonal Chemistries

Many different combinations of orthogonal chemistries may be used to create nanodomains having selective binding. The examples listed above detail example nanodomains including PPMA and PAAm, which include amino and alkynyl functional groups, respectively. However, amino and alkynyl functional groups are just one combination of many orthogonal chemistries that may be suitable. Table 1 lists several example combinations of nanodomain chemistries and reactions which may be suitable for creating orthogonally functionalized nanodomains.

TABLE 1

| Nanodomain functionality 1 | Reaction 1 | Nanodomain functionality 2 | Reaction 2 |
|---|---|---|---|
| Alkynyl functional group | 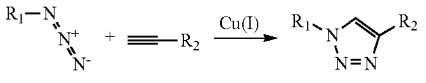 | Azide functional group | 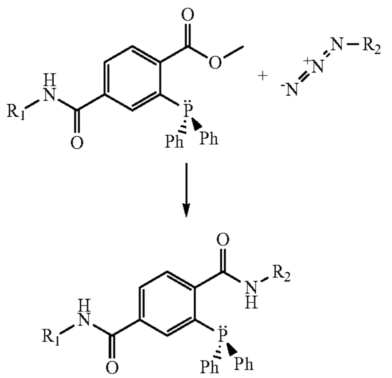 |

TABLE 1-continued
| Nanodomain functionality 1 | Reaction 1 | Nanodomain functionality 2 | Reaction 2 |
|---|---|---|---|
| Alkynyl functional group | 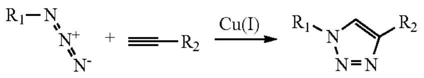 | Azide functional group | 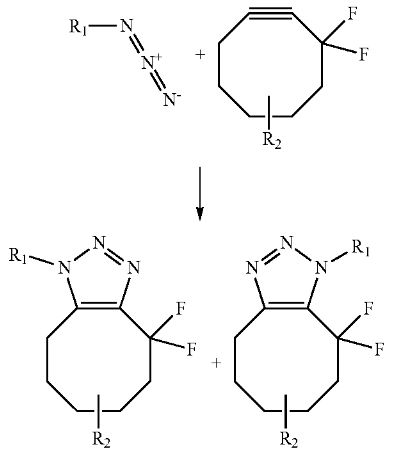 |
| Amino NHS ester reaction | 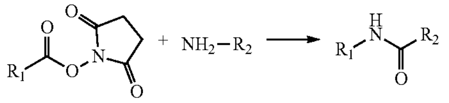 | Azide Cu(I) click reaction | 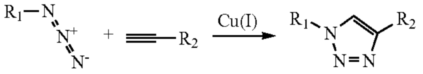 |
| Thiol Michael addition | 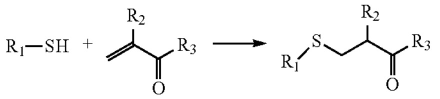 | Azide Cu(I) click reaction | 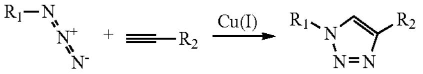 |
| Thiol-ene coupling | 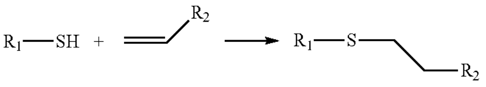 | Azide Cu(I) click reaction | 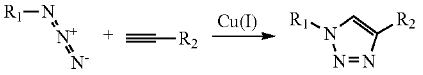 |
| Thiol Michael addition | 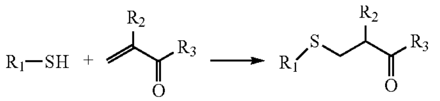 | Azide Cu-free SPAAC click | 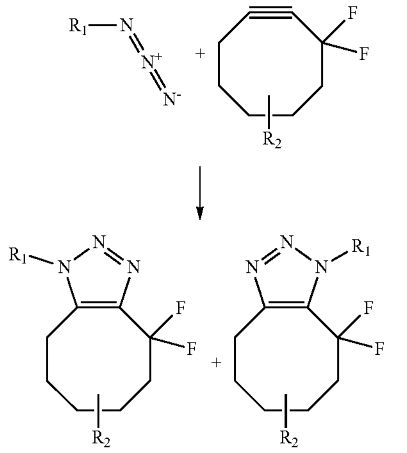 |

TABLE 1-continued
| Nanodomain functionality 1 | Reaction 1 | Nanodomain functionality 2 | Reaction 2 |
|---|---|---|---|
| Thiol-ene coupling | 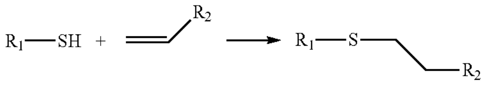 | Azide Cu-free SPAAC click | 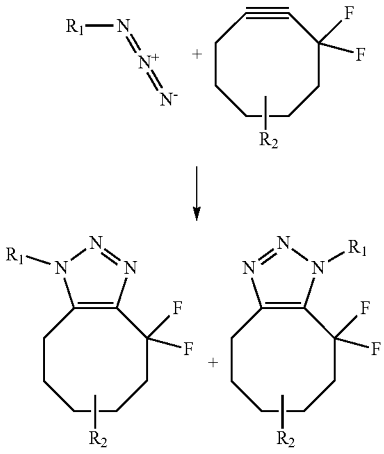 |
| Carboxyl EDC-NHS amino coupling | 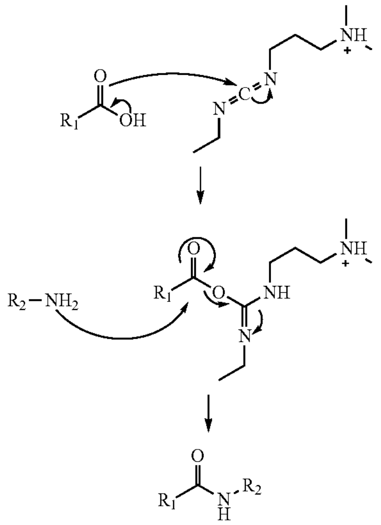 | Alkene thiol-ene coupling | 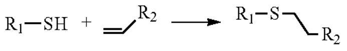 |
| Alkynyl Cu(I) click | 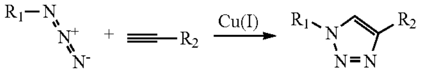 | Alkene thiol-ene coupling | 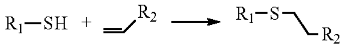 |
| Alkynyl Cu-free SPAAC click reaction | 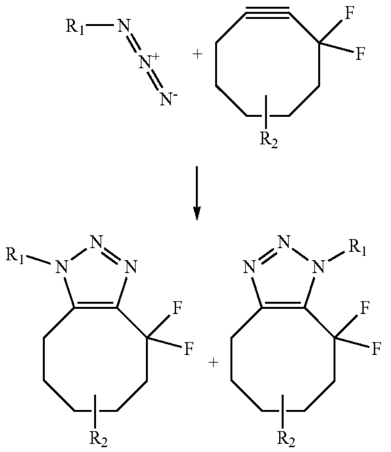 | Alkene thiol-ene coupling | 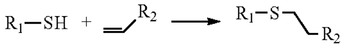 |

TABLE 1-continued

| Nanodomain functionality 1 | Reaction 1 | Nanodomain functionality 2 | Reaction 2 |
|---|---|---|---|
| Terminal alkene | Hydroboration reaction | Internal alkene thiol-ene coupling | 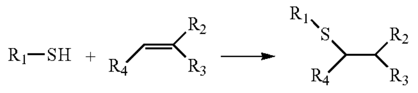 |

Preparation of Alkyne or Acetylene Functionalized Polymer Layer

It may be advantageous to create a polymer layer in which the acetylene functionality is distributed throughout the polymer layer, not just on the surface. Distribution of acetylene functional groups throughout the polymer layer ensures that after etching, for example after dry etching or plasma ashing, there are still acetylene functional groups available at the newly etched surface.

In previous examples, PPMA was discussed as a material having an acetylene functionality which may be desirable to use in an orthogonal nanodomain. PPMA is not the only material with acetylene functionality that may be used, however. Below are listed various example molecular components which may be incorporated into an acetylene-functionalized polymer layer.

There are many suitable monomers that may be used in an acetylene-functionalized polymer layer. These monomers may include one or more of, for example, polyhedral-oligomeric-silsesquioxane-propargyl (POSS-propargyl) having one or more alkynyl functional groups, propargyl methacrylate, octamethylcyclotetrasiloxane-propargyl (D4-propargyl), 2,4,6,8-tetramethyl-2,4,6,8-tetraksi(3-acryloxyloxypropyl)cyclotetrasiloxane (AD4), glycerol 1,3-diglycerolate diacrylate (GD2A), pentaerythritol tetraacrylate (PE4A), trimethylpropane tricrylate (TMP3A), glycerol dimethacrylate (GD2MA), pentaerythritol triacrylate (PE3A), 2,2-Bis [4-(3-acryloyloxy-2-hydroxypropoxy)phenyl]propane (BP2A), 3-(acryloyloxy)-2-hydroxypropyl methacrylate (HPMMAA) 1524, and/or ethylene glycol dimethacrylate (EG2MA).

One example crosslinking genus that may be used in an acetylene functionalized polymer layer is a bisazidomethyl compound,

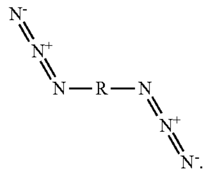

Bisazidomethyl compounds may be used as a crosslinker in an acetylene functionalized polymer layer. The R group of the bisazidomethyl compounds may be any suitable organic group.

There are many suitable initiators for synthesizing an acetylene-functionalized polymer layer. These initiators may include, for example azobisisobutyronitrile (AIBN), 1,1'-Azobis(cyclohexanecarbonitrile) (ACHN), dimethyl 2,2'-azobis(2-methylpropionate), 2,2-dimethoxy-2-phenylacetephenone (DPA), 2-hydroxy-2-methylpriophenone (HMPP), 2,2'-azobis(2,4-dimethylvaneronitrile), 2,2'-azobis(4-methoxy-2,4-dimethylvaleronitrile), 2,2'-azobis(N-butyl-2-methylpropionamide), diphenyl(2,4,6-trimethylbenzoyl) phosphine oxide (DPBAPO), phenylbis(2,4,6-trimethylbenzoyl)phosphine oxide (TMBAPO), and/or pentabromobenzyl acrylate (BPPA).

Preparation of Amino Functionalized Polymer Layer

It may be advantageous to create a polymer layer in which the amino functionality is distributed throughout the polymer layer, not just on the surface. Distribution of amino functional groups throughout the polymer layer ensures that after etching, for example after dry etching or plasma ashing, there are still amino functional groups available at the newly-etched surface.

In previous examples, PAAm was discussed as a material having an amino functionality which may be desirable to use in an orthogonal nanodomain. PAAm is not the only material with amino functionality that may be used, however. Below are listed various example molecular components which may be incorporated into an amino functionalized polymer layer.

There are many suitable monomers that may be used in an amino functionalized polymer layer. These monomers may include one or more of, for example, polyhedral-oligomeric-silsesquioxane-amine (POSS-amine), octamethylcyclotetrasiloxane-amine (D4-amine), allylamine, 2,4,6,8-tetramethyl-2,4,6,8-tetrakis(3-acryloyloxypropyl) cyclotetrasiloxane (AD4), glycerol 1,3-diglycerolate diacrylate (GD2A), pentaerythritol tetraacrylate (PE4A), trimethylpropane tricrylate (TMP3A), poly(ethylene glycol) dimethacrylate (PEG2MA), glycerol dimethacrylate (GD2MA), pentaerythritol triacrylate (PE3A), pentaerythritol triacrylate (PE3A), 2,2-Bis [4-(3-acryloyloxy-2-hydroxypropoxy)phenyl]propane (BP2A), 3-(acryloyloxy)-2-hydroxypropyl methacrylate (HPMMAA), and/or ethylene glycol dimethacrylate (EG2MA).

There are many suitable initiators for synthesizing an amino functionalized polymer layer. These initiators may include, for example, azobisisobutyronitrile (AIBN), 1,1'-Azobis(cyclohexanecarbonitrile) (ACHN), dimethyl 2,2'-azobis(2-methylpropionate), 2,2-dimethoxy-2-phenylacetephenone (DPA), 2-hydroxy-2-methylpriophenone (HMPP), 2,2'-azobis(2,4-dimethylvaneronitrile), 2,2'-Azobis(4-methoxy-2,4-dimethylvaleronitrile), 2,2'-azobis(N-butyl-2-methylpropionamide), diphenyl(2,4,6-trimethylbenzoyl) phosphine oxide (DPBAPO), phenylbis(2,4,6-trimethylbenzoyl)phosphine oxide (TMBAPO), and/or pentabromobenzyl acrylate (BPPA).

While the above detailed description has shown, described, and pointed out novel features, it can be understood that various omissions, substitutions, and changes in the form and details of the devices or algorithms illustrated can be made without departing from the spirit of the disclosure. As can be recognized, certain portions of the description herein can be embodied within a form that does not provide all of the features and benefits set forth herein, as some features can be used or practiced separately from others. The scope of certain implementations disclosed herein is indicated by the appended claims rather than by the foregoing description. All changes which come within the meaning and range of equivalency of the claims are to be embraced within their scope.

What is claimed is:

1. A patterned substrate, comprising:

a base support;

a multi-layer stack positioned over the base support; the multi-layer stack comprising:

a first layer positioned over the base support;

a second layer positioned over the first layer, wherein the second layer comprises a plurality of depressions through the second layer and expose a surface of the first layer; and a functionalized hydrogel within at least a portion of the plurality of depressions, wherein the functionalized hydrogel is covalently attached to the first layer;

wherein the first layer comprises poly(allylamine) (PAAm) and the second layer comprises poly (propargyl methacrylate) (PPMA), or the first layer comprises PPMA and the second layer comprises PAAm.

2. The patterned substrate of claim 1, wherein the depression comprises a swath, a fiducial, a lane, or a well.

3. The patterned substrate of claim 1, wherein the functionalized hydrogel comprises a polyacrylamide copolymer having functional groups that form covalent bonding with the PAAm or PPMA of the first layer of the multi-layer stack.

4. The patterned substrate of claim 1, wherein the first layer of the multi-layer stack comprises PAAm and the second layer of the multi-layer stack comprises PPMA.

5. The patterned substrate of claim 4 , wherein the functionalized hydrogel comprises N-hydroxysuccinimide (NHS) ester groups that form amide bonds with the first layer.

6. The patterned substrate of claim 1, wherein the first layer of the multi-layer stack comprises PPMA and the second layer of the multi-layer stack comprises PAAm.

7. The patterned substrate of claim 6, wherein the functionalized hydrogel comprises azido groups that form triazoline bonds with the first layer.

8. The patterned substrate of claim 7, wherein the functionalized hydrogel comprises poly (N-(5-azidoacetamidylpentyl) acrylamide-co-acrylamide) (PAZAM).

9. The patterned substrate of claim 1, further comprising oligonucleotide or polynucleotide primers attached to the functionalized hydrogel.

10. A patterned substrate, comprising:

a base support;

a multi-layer stack positioned over the base support; the multi-layer stack comprising:

a first layer positioned over the base support;

a second layer positioned over the first layer, wherein the second layer comprises a first plurality of depressions through the second layer which expose a surface of the first layer; and a third layer positioned over the second layer, wherein the third layer comprises a second plurality of depressions through the third layer which expose a surface of the second layer, wherein the second plurality of depressions are spatially separated from the first plurality of depressions;

a first functionalized hydrogel within at least a portion of the first plurality of depressions, wherein the first functionalized hydrogel is covalently attached to the first layer; and a second functionalized hydrogel within at least a portion of the second plurality of depressions, wherein the second functionalized hydrogel is covalently attached to the second layer;

wherein the first layer of the multi-layer stack comprises a first polymer having a plurality of first functional groups selected from the group consisting of an amino, an alkynyl, a cycloalkenyl, a cycloalkynyl, a carboxyl, a vinyl, and a thiol;

wherein the second layer of the multi-layer stack comprises a second polymer having a plurality of second functional groups selected from the group consisting of an amino, an alkynyl, a cycloalkenyl, a cycloalkynyl, a carboxyl, a vinyl, and a thiol, and the second functional groups are orthogonal to the first functional groups; and wherein the third layer does not comprise either the first or the second functional groups, and wherein the third layer is inert to both the first functionalized hydrogel and the second functionalized hydrogel.

11. The patterned substrate of claim 10, wherein the first functionalized hydrogel comprises a first polyacrylamide copolymer having functional groups that form covalent bonding with the plurality of first functional groups.

12. The patterned substrate of claim 10, wherein the second functionalized hydrogel comprises a second polyacrylamide copolymer having functional groups that form covalent bonding with the plurality of second functional groups.

13. The patterned substrate of claim 10, wherein the first layer of the multi-layer stack comprises amino groups and the second layer of the multi-layer stack comprises alkynyl groups.

14. The patterned substrate of claim 13, wherein the first layer of the multi-layer stack comprises poly (allylamine) (PAAm) and the second layer of the multi-layer stack comprises poly (propargyl methacrylate) (PPMA).

15. The patterned substrate of claim 13, wherein the first functionalized hydrogel comprises N-hydroxysuccinimide (NHS) ester groups that form amide bonds with the first layer.

16. The patterned substrate of claim 15, wherein the second functionalized hydrogel comprises azido groups that form triazoline bonds with the second layer.

17. The patterned substrate of claim 10, wherein the first layer of the multi-layer stack comprises alkynyl groups and the second layer of the multi-layer stack comprises amino groups.

18. The patterned substrate of claim 17, wherein the first layer of the multi-layer stack comprises PPMA and the second layer of the multi-layer stack comprises PAAm.

19. The patterned substrate of claim 17, wherein the first functionalized hydrogel comprises azido groups that form triazoline bonds with the first layer.

20. The patterned substrate of claim 19, wherein the second functionalized hydrogel comprises N-hydroxysuccinimide (NHS) ester groups that formamide bonds with the second layer.

21. The patterned substrate of claim 10, wherein the first or second functionalized hydrogel comprises (N-(5-azidoacetamidylpentyl) acrylamide-co-acrylamide) (PAZAM).

22. The patterned substrate of claim 10, wherein the first plurality of depressions comprise or define a first region on the substrate, and the second plurality of depressions comprise or define a second region on the substrate, wherein the first region is either spatially separate from the second region, or the first region is overlapping with the second region.

* * * * *